United States Patent
Cromwell et al.

(10) Patent No.: US 7,376,710 B1
(45) Date of Patent: *May 20, 2008

(54) METHODS AND SYSTEMS FOR PROVIDING ACCESS TO STORED AUDIO DATA OVER A NETWORK

(75) Inventors: David Carroll Cromwell, Durham, NC (US); Jeffrey Dean Lanning, Cary, NC (US); Michael Eugene Durling, Los Gatos, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/430,045

(22) Filed: Oct. 29, 1999

(51) Int. Cl.
*G06F 15/16* (2006.01)

(52) U.S. Cl. .................. 709/219; 379/1.02; 379/88.01; 379/88.05

(58) Field of Classification Search ................. 707/102, 707/103; 370/352, 262, 345, 259; 379/88, 379/67, 266, 101, 71, 87, 219, 72, 93, 2, 379/88.05, 88.14, 114.02, 1.02, 88.01; 709/231, 709/249, 203, 224; 704/256, 270; 386/97, 386/68; 705/26; 455/66; 703/218; 725/35; 715/500, 501.1
See application file for complete search history.

(56) References Cited

U.S. PATENT DOCUMENTS

| | | | | |
|---|---|---|---|---|
| 4,357,493 A | * | 11/1982 | Anderson et al. ............. | 379/72 |
| 4,439,635 A | * | 3/1984 | Theis et al. .................... | 379/87 |
| 4,545,043 A | * | 10/1985 | Anderson et al. ............. | 379/71 |
| 4,706,270 A | * | 11/1987 | Astegiano et al. ............. | 379/2 |
| 5,375,164 A | * | 12/1994 | Jennings .................. | 379/88.05 |
| 5,434,910 A | * | 7/1995 | Johnson et al. .......... | 379/88.15 |
| 5,511,112 A | * | 4/1996 | Szlam ........................ | 379/266 |
| 5,528,672 A | * | 6/1996 | Wert ....................... | 379/93.22 |
| 5,530,950 A | * | 6/1996 | Medan et al. ................. | 379/88 |
| 5,539,808 A | * | 7/1996 | Inniss et al. ............. | 379/88.22 |
| 5,661,787 A | * | 8/1997 | Pocock ....................... | 379/101 |
| 5,793,980 A | * | 8/1998 | Glaser et al. ............... | 709/231 |
| 5,812,533 A | * | 9/1998 | Cox et al. .................... | 370/259 |
| 5,859,902 A | * | 1/1999 | Freedman ............. | 379/114.02 |

(Continued)

FOREIGN PATENT DOCUMENTS

WO       WO 97/40611       10/1997

OTHER PUBLICATIONS

Mauricio Arango, Andrew Dugan, Isacc Elliott, Christian Huitema, Scott Pickett; "Media Gateway Control Protocol (MCGP) Version 0.1 Draft"; Internet Engineerring Task Force; Feb. 21, 1999; pp. 1-90; XP-002278702.*

(Continued)

*Primary Examiner*—Meng-al T. An
(74) *Attorney, Agent, or Firm*—Withrow & Terranova, PLLC

(57) ABSTRACT

Methods and systems for providing access to stored audio data include a convenient syntax that facilitates control of an audio server. The methods and systems are capable of playing provisioned sequences of audio data to end users, where the provisioned sequences are identifiable using a unique audio identifier. A set data structure provides access to stored audio data using a unique audio identifier and a selector for choosing a member within a set. Function and navigation keys allow end users to control playback of audio, recording of speech, and collection of digits.

47 Claims, 13 Drawing Sheets

U.S. PATENT DOCUMENTS

| | | | | |
|---|---|---|---|---|
| 5,861,881 | A | * | 1/1999 | Freeman et al. ......... 715/500.1 |
| 5,884,262 | A | | 3/1999 | Wise et al. ................. 704/270 |
| 5,918,213 | A | * | 6/1999 | Bernard et al. ............... 705/26 |
| 5,926,789 | A | * | 7/1999 | Barbara et al. .......... 704/270.1 |
| 5,978,855 | A | * | 11/1999 | Metz et al. ................. 709/249 |
| 6,014,427 | A | * | 1/2000 | Hanson et al. ............... 379/67 |
| 6,064,673 | A | | 5/2000 | Anderson et al. ........... 370/389 |
| 6,085,160 | A | * | 7/2000 | D'hoore et al. ............. 704/256 |
| 6,199,076 | B1 | * | 3/2001 | Logan et al. ............ 715/501.1 |
| RE37,131 | E | * | 4/2001 | Mankovitz ................. 455/66.1 |
| 6,212,527 | B1 | * | 4/2001 | Gustman .................... 707/102 |
| 6,240,448 | B1 | * | 5/2001 | Imielinski et al. .......... 709/218 |
| 6,279,041 | B1 | | 8/2001 | Baber et al. ................. 709/232 |
| 6,327,343 | B1 | * | 12/2001 | Epstein et al. ........... 379/88.01 |
| 6,353,831 | B1 | * | 3/2002 | Gustman ................ 707/103 R |
| 6,404,746 | B1 | * | 6/2002 | Cave et al. ................. 370/262 |
| 6,408,128 | B1 | * | 6/2002 | Abecassis .................... 386/68 |
| 6,434,138 | B2 | * | 8/2002 | Kersken et al. ............. 370/349 |
| 6,434,140 | B1 | * | 8/2002 | Barany et al. .............. 370/352 |
| 6,442,335 | B1 | * | 8/2002 | Cookson et al. .............. 386/97 |
| 6,445,697 | B1 | | 9/2002 | Fenton ....................... 370/357 |
| 6,477,704 | B1 | * | 11/2002 | Cremia ........................ 725/35 |
| 6,483,912 | B1 | * | 11/2002 | Kalmanek et al. .......... 379/219 |
| 6,496,570 | B1 | * | 12/2002 | Nimphius ................ 379/88.25 |
| 6,529,584 | B1 | * | 3/2003 | Ravago et al. ................ 379/67 |
| 6,567,399 | B1 | * | 5/2003 | Schuster et al. ............ 370/352 |
| 6,748,055 | B1 | * | 6/2004 | Borman et al. .......... 379/88.14 |

OTHER PUBLICATIONS

Lords, Tom, "http://samspade.org/ssw/help/d_regex.htm," Regular Expressions, Internet Source (Berkley, California), pp. 1-11, (1996).

Handley et al., "Internet Draft," SIP: Session Initiation Protocol, Network Working Group, pp. 1-141, (Mar. 1999).

Arango et al., "Internet Draft," draft-huitema-megaco-mgcp-v0r2-05.txt, Media Gateway Control Protocol (MGCP), Internet Engineering Task Force, pp. 1-119, (Feb. 21, 1999) draft-huitema-megaco-mgcp-v0r2-05.txt.

Cuervo et al., "Internet Draft", draft-ietf-megaco-protocol-00.txt, MEGACO/H.GCP, Internet Engineering Task Force, pp. 2-71, (Jul. 20, 1999).

Cromwell et al., "Internet Draft," draft-cromwell-navdec-mgcp-audio-pkg-00.txt, A Syntax for the MGCP Audio Package, Internet Engineering Task Force, pp. 1-21, (Nov. 1998).

Cromwell et al., "Internet Draft," draft-cromwell-navdec-media-req-00.txt, Requirements for Control of a Media Services Function, Internet Engineering Task Force, pp. 1-27, (Nov. 1998).

Huitema et al., "Internet Draft," draft-huitema-megaco-mgcp-flows-01.txt, Media Gateway Control Protocol (MGCP) Call Flows, Internet Engineering Task Force, pp. 1-125, (Jan. 1999).

Microsoft Press Computer Dictionary, 3$^{rd}$ edition, copyright 1997, p. 247.

Arango, Mauricio et al., "Media Gateway Control Protocol (MGCP) Version 0.1," IETF, Internet Draft, Feb. 21, 1999, XP002278702, Retrieved from the Internet, <URL:http://www.cds.columbia.edu/sip/drafts/draft-huitema-megaco-mgcp-v0r1-05.txt>.

Bayer, M. "Four Things to Remember." ECTF Framework, Oct. 6, 1999, XP002212522, retrieved from the Internet, <URL:www.ctexpert.com/BayerIPR.pdf>.

Cromwell, D., "Proposal for an MGCP Advanced Audio Package," Network Working Group, RFC 2897, Aug. 2000, XP002212513, Retrieved from the Internet, <URL:http://www.ietf.org/rfc/rfc2897,txt>.

Cromwell, D. et al., "Requirements for Control of a Media Services Function," IETF, Internet Draft, Nov. 1998, XP002278701.

Cromwell, D. et al., "Suggested Requirements for Control of an IVR Function," IETF, Internet Draft, Apr. 1999, XP002278699, <URL:http://ftp.ist.utl.pt/pub/drafts/draft-cromwell-megaco-ivr-req-00.txt>.

Cromwell, D., "A Syntax for the MGCP Audio Package," IETF, Internet Draft, Nov. 1998, XP002278700, Retrieved from the Internet, <URL:http://www.openphone.org/docs/mgcp/draft-cromwell-navdec-mgcp-audio-pkg-00.txt>.

European Search Report for Application No. 00309 81.2, issued on May 17, 2004.

* cited by examiner

METHODS AND SYSTEMS FOR PROVIDING ACCESS TO STORED AUDIO DATA OVER A NETWORK

TECHNICAL FIELD

The present invention relates generally to methods and systems for providing access to stored audio data. More particularly, the present invention relates to methods and systems for providing access to stored audio data over a network.

RELATED ART

In conventional telecommunications networks, a central switch provides audio data to users that access the switch. For example, to play an announcement, such as, "The time is five o'clock", a central switch includes application software and hardware specifically designed to determine the time and "play" the announcement. Changing the original function or providing new functions requires new application software, and possibly even hardware upgrades at the central switch.

FIG. 1 illustrates a conventional telecommunications network including a central switch. In the network illustrated in FIG. 1, a central switch S1 includes announcement software 100 and hardware 102 to provide user access to audio data. End users 104, such as residential telephone customers, access the stored audio data through the public switched telephone network (PSTN) 106 and access devices 108. In the network illustrated in FIG. 1, all calls are routed through switch S1. Thus, in this type of network, it makes sense to provide audio data access through the switch S1. However, as stated above, in order to add new services, hardware and/or software modifications at switch S1 are required.

More recently, functionality for providing audio data and other conventionally centralized features to end users has been distributed across network elements. In a distributed network environment, end users can communicate with each other over a packet-based network, such as an Internet Protocol (IP) network, in which the path that a message takes through the network is not guaranteed. In such a network, end users can communicate with each other and with other network elements through access devices or gateways that translate between circuit- and packet-based communications protocols. Call agent software running on a gateway controller performs call-related functions, such as call setup. Thus, when user A desires to call user B, the gateway and call agent for user A contact user B through the gateway and call agent for user B. Communication occurs between user A and user B by sending packets over the network.

One particular type of gateway that can be connected to a packet-based network is an audio server. Audio servers store audio data to be played to users, record audio from users, and collect digits from users. For example, an audio server managed by a telephone company can play an announcement indicating the company name when the user accesses the company's telephone network.

One problem with existing protocols for communicating audio information to end users in both the conventional switch-centric networks and the more recent distributed networks is that the protocols do not provide for methods for communicating complex audio data to end users. For example, it might be desirable to provide user access to announcements in a variety of languages. However, the format of the announcement can change, depending on the language. For example, an announcement can contain a number, such as 21. In English, the announcement is "twenty-one". In French, the announcement has a completely different format because the number 21 literally translates to "twenty and one", i.e., "vingt et un". Thus, providing user access to announcements in different languages can require complex audio server application software and hardware.

Existing telephony protocols, such as: International Telecommunications Union (ITU) Recommendation Q. 1218, INAP Protocol for Support of Capability Set 1, April-May 1998, (CS1-R); ISCP-IP Interface Specification, Issue 2, Jan. 1997; GR-1129-CORE AINGR: Switch-Intelligent Peripheral Interface (IPI), Issue 3, September 1997; and the Media Gateway Control Protocol (MGCP) do not provide sufficient functionality to assemble and play complex audio data to end users in a telecommunications network. For example, MGCP includes an announcement server package that specifies events and signals supported by an announcement server. One event or action specified for the announcement server is to play an announcement. The protocol provides a syntax by which a call agent can instruct a gateway to play an announcement specified by a uniform resource locator (url). Thus, MGCP simply specifies a method for locating audio files by filename and location, through a url, and playing the located files. No methods are defined for assembling complex audio data, such as multi-language data, and playing the assembled audio data to an end user.

Thus, in light of these difficulties, there exists a need for improved methods and systems for providing access to stored audio data over a network.

DISCLOSURE OF THE INVENTION

The present invention provides improved methods and systems for providing access to stored audio data over a network, such as a telecommunications network. A convenient syntax is provided, including events and parameters allowing remote access to stored audio data.

An audio server includes a database of provisioned audio segments. As used herein, an audio segment is the atomic unit of audio data. Each audio segment is uniquely identifiable by an audio identifier. An audio identifier is a number or code uniquely associated with an audio segment. Audio segments can be any of a plurality of segment types, including recording, text, silence, tone, variable, sequence, and set. A recording segment is a single piece of recorded audio data. A text segment is a block of text to be converted to speech or to be displayed. A silence segment specifies a length of silence. A tone segment specifies a tone to be played. A variable segment specifies a variable by type, sub-type, and value. A sequence segment specifies multiple segments to be played in a specific order. A set segment references a hierarchical arrangement of segments accessed using a selector specified at run time. Each of these types will be discussed in more detail below.

BRIEF DESCRIPTION OF THE DRAWINGS

A description of the invention will now proceed with reference to the accompanying drawings of which:

FIG. 4(*a*) is a block diagram of exemplary audio server hardware including methods and systems for providing access to stored audio data according to the present invention;

DETAILED DESCRIPTION OF THE INVENTION

Exemplary Operating Environment

Figure 2:
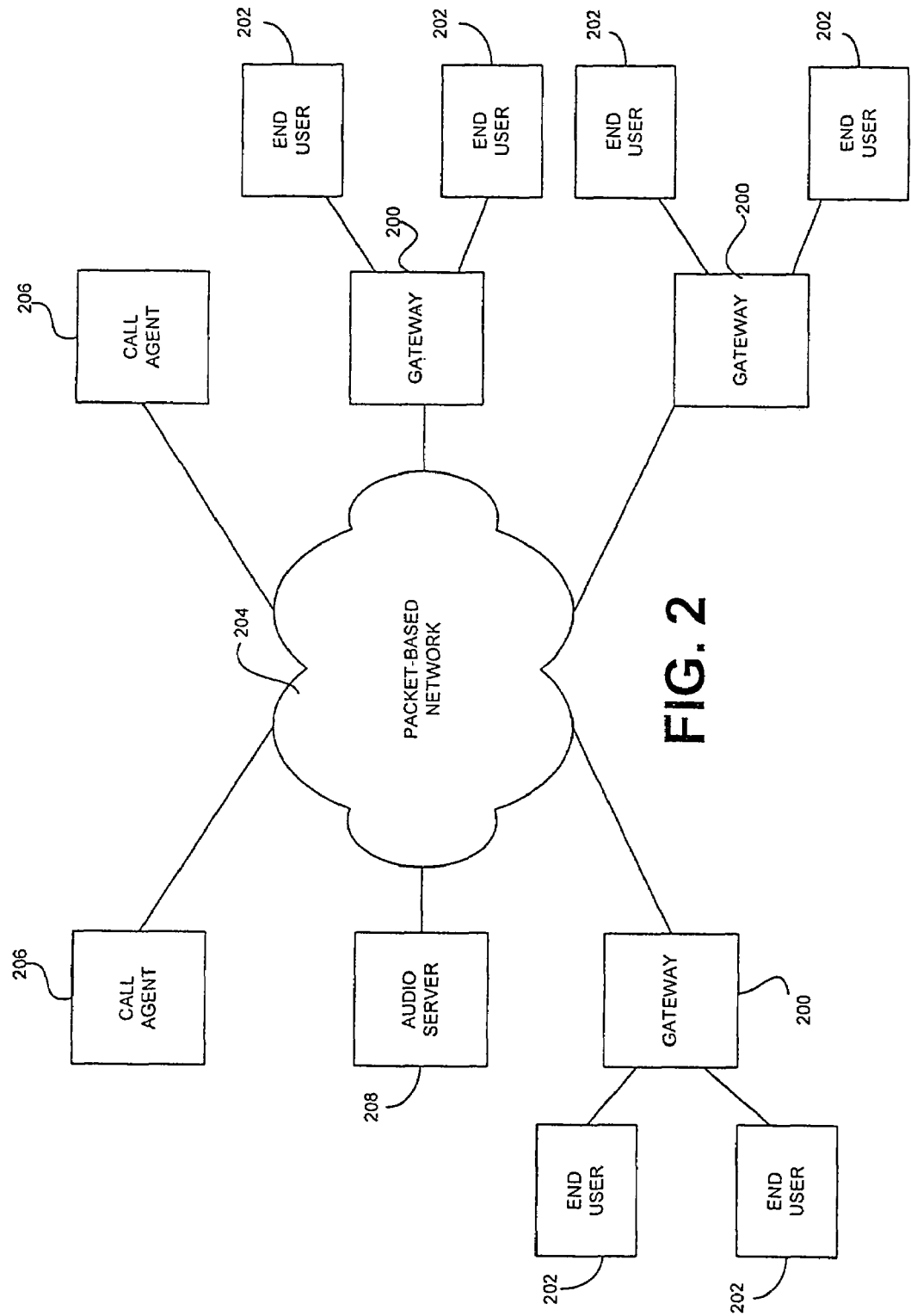
FIG. 2 is a block diagram illustrating an exemplary operating environment for the methods and systems for providing access to stored audio data according to the present invention.

FIG. 2 of the drawings illustrates an exemplary operating environment for the methods and systems for accessing stored audio data according to the present invention. In FIG. 2, a plurality of gateways 200 allow end users 202 to communicate with each other over a packet-based network 204, such as a TCP/IP over ATM network. Gateways 200 translate between circuits and packets and vice versa. Call agents 206 perform call processing functions for gateways 200, such as call setup. An audio server 208 provides access to audio data through packet-based network 204. Audio server 208 is a type of gateway that manages a database of audio data that can be played in response to requests from call agents.

Communication Using MGCP

The network entities illustrated in FIG. 2 can communicate using MGCP. According to MGCP, endpoints communicate with each other over connections. Endpoints are sources or sinks of data and can be physical or virtual. An example of a physical endpoint is an interface on a gateway that terminates a trunk connected to a PSTN switch, e.g., a class 5 switch, a class 4 switch, etc. An example of a virtual endpoint is an audio source in an audio server. Creation of physical endpoints requires hardware installation, while creation of virtual endpoints can be done by software.

Connections in MGCP can be point-to-point or multipoint. A point-to-point connection is an association between two endpoints with the purpose of transmitting data between these endpoints. Once this association is established for both endpoints, data transfer between these endpoints can take place. A multipoint connection is established by connecting an endpoint to a multipoint session.

Connections can be established over several types of bearer networks:

- transmission of audio packets using real time protocol (RTP) and user datagram protocol (UDP) over a TCP/IP network;
- transmission of audio packets using ATM Adaption Layer 2 (AAL2) or other adaption layer, over an asynchronous transfer mode (ATM) network; and
- transmission of packets over an internal connection, for example, the time-division multiplexing (TDM) backplane or the interconnection bus of a gateway. This form of connection is used for hairpin connections, i.e., connections that terminate in a gateway but are immediately re-routed over the telephone network.

For point-to-point connections, the endpoints of a connection can be in separate gateways or in the same gateway.

Two types of endpoints defined in MGCP that are relevant to the methods and systems for providing access to audio data according to the present invention are announcement server endpoints and interactive voice response (IVR) endpoints. An announcement server endpoint provides access to an announcement service. Under request from a call agent, the announcement server will play a specified announcement. The request from the call agent will follow the event signaling and reporting procedures as defined in MGCP, as will be discussed in more detail below. An IVR endpoint provides access to an IVR service. Under request from the call agent, the IVR server will play announcements and tones, and will listen to responses from the user. The methods and systems for providing access to stored audio data according to the present invention can function at either of these types of endpoints to provide convenient user access to stored audio data.

Events

The concept of events and signals is central to MGCP. An event is an action performed by a gateway or detected by a gateway. A package consists of a set of events. The gateway can signal an event, i.e., it can cause it to happen, or it can detect the occurrence of an event, e.g., a line status change from off-hook to on-hook. A call agent can request that the gateway perform an event and notify the call agent upon completion. A call agent can also request that the gateway detect an event and notify the call agent when the event occurs.

One event package defined in MGCP relevant to delivery of audio data is the announcement server package. Table 1 shown below illustrates the announcement server package:

TABLE 1

Announcement Server Package

| Symbol | Definition | R | S | Duration |
|---|---|---|---|---|
| ann(url, parms) | play an announcement | | TO | variable |
| oc | report on completion | X | | |
| of | report failure | X | | | in Table 1, the first column specifies the text symbols for the events in the announcement server package. The text symbols are used in protocol messages transmitted between the call agent and the audio server. The column labeled "Definition" defines the events. These text symbols are used in protocol messages to instruct protocol software to perform a specified action. The column labeled "R" indicates whether a call agent can request that an endpoint detect the specified event. If an X appears in the column, the call agent can request that an endpoint detect the specified event. If nothing appears, the call agent cannot request detection of the event. The columns labeled "S" and "Duration" indicate whether the call agent can request that the gateway perform a specified event and the duration of the event. A blank entry in the "S" column indicates that the call agent cannot request performance of the event. The entries "TO" in the "S" column and "variable" in the "Duration" column for the play announcement event indicate that the play announcement event is a timeout signal that lasts for a variable duration, unless it is superceded by another signal.

As indicated in Table 1 and as discussed above, the announcement server package in MGCP merely allows a call agent to instruct a gateway to play an announcement specified by a url and indicate whether or not the event is successful. No events or parameters are defined for assembling and playing complex pieces of audio data.

Commands

There are eight commands defined in MGCP. The commands are:
  CreateConnection
  ModifyConnection
  DeleteConnection
  NotificationRequest
  Notify
  AuditEndpoint
  AuditConnection
  RestartInProgress The CreateConnection is sent by the call agent to a gateway to create a connection between two endpoints. The ModifyConnection command is sent by a call agent to a gateway or by a gateway to a call agent to modify parameters of a connection between endpoints, such as the coding scheme associated with a connection. The DeleteConnection command is sent by a call agent to a gateway to delete a connection between two endpoints. The NotificationRequest command is sent by a call agent to the gateway to either request that the gateway notify the call agent upon the occurrence of a certain event or to request that the gateway perform a certain event. The Notify command is sent by a gateway to a call agent when observed events occur. The AuditEndpoint command and AuditConnection commands are sent by the call agent to the gateway to retrieve parameters attached to an endpoint or a connection. Finally, the RestartInProgress command is sent by a gateway to a call agent to indicate that the gateway is restarting.

Communication between gateways and call agents in MGCP occur through transactions comprising commands and mandatory responses. Each command includes a command header line and parameter lines, optionally followed by a session description. The command header line, the parameter lines, and the session description are encoded as text, separated by a carriage return and line feed character, or, optionally, a single line feed character. The session description is separated from the rest of the message by an empty line. MGCP uses a transaction identifier to correlate commands and responses. The transaction identifier is encoded as a component of the command header and repeated as a component of the response header.

The command header is a single line composed of a command, identifying the requested action or verb, the transaction identifier, the endpoint to which the action is requested, and the MGCP protocol version and a set of parameter lines, composed of a parameter name followed by a parameter value. A command line is composed of the name of the requested verb, the identification of the transaction, the name of the endpoint that should execute the command, and the protocol version.

Verbs in MGCP are encoded as four-letter upper- or lowercase ASCII codes corresponding to the MGCP commands as indicated in the following table.

TABLE 2

MGCP Verbs

| Verb | Code |
|---|---|
| EndpointConfiguration | EPCF |
| CreateConnection | CRCX |
| ModifyConnection | MDCX |
| DeleteConnection | DLCX |
| NotificationRequest | RQNT |
| Notify | NTFY |
| AuditEndpoint | AUEP |
| AuditConnection | AUCX |
| RestartInProgress | RSIP |

Transaction identifiers are encoded as a string of up to nine decimal digits. Endpoint identifiers are encoded as e-mail addresses, as defined in Request for Comment (RFC) 821. In these addresses, the domain name identifies the system where the endpoint is attached while the left side identifies the specific endpoint on the system. An example of an endpoint identifier is "audio/3@as1.nortelnetworks.com". This example refers to the busy signal virtual endpoint in the announcement server number 12.

Parameter lines are composed of a parameter name, which, in most cases, is composed of a single uppercase character, followed by a colon, a white space, and the parameter value. For example, S: ann(http://scripts.example.net/all-lines-busy.au)

is a parameter line that is used in the NotifyRequest command, to instruct a gateway to send a specified signal to an endpoint. In the parameter line, "S" indicates the signal request parameter. The signal request parameter provides the name of the event that the call agent is requesting to be performed. In this example, "ann" is the event name. As illustrated in Table 1 above, "ann" is the symbol for the event in the announcement server package that specifies the playing of an announcement. The parameter inside the parentheses is the url corresponding to the announcement to be played. In the example, the url specifies an audio message for "all lines busy". Additional signals and parameters will be explained in the context of an MGCP call flow.

Example MGCP Call Flow

Figure 3:
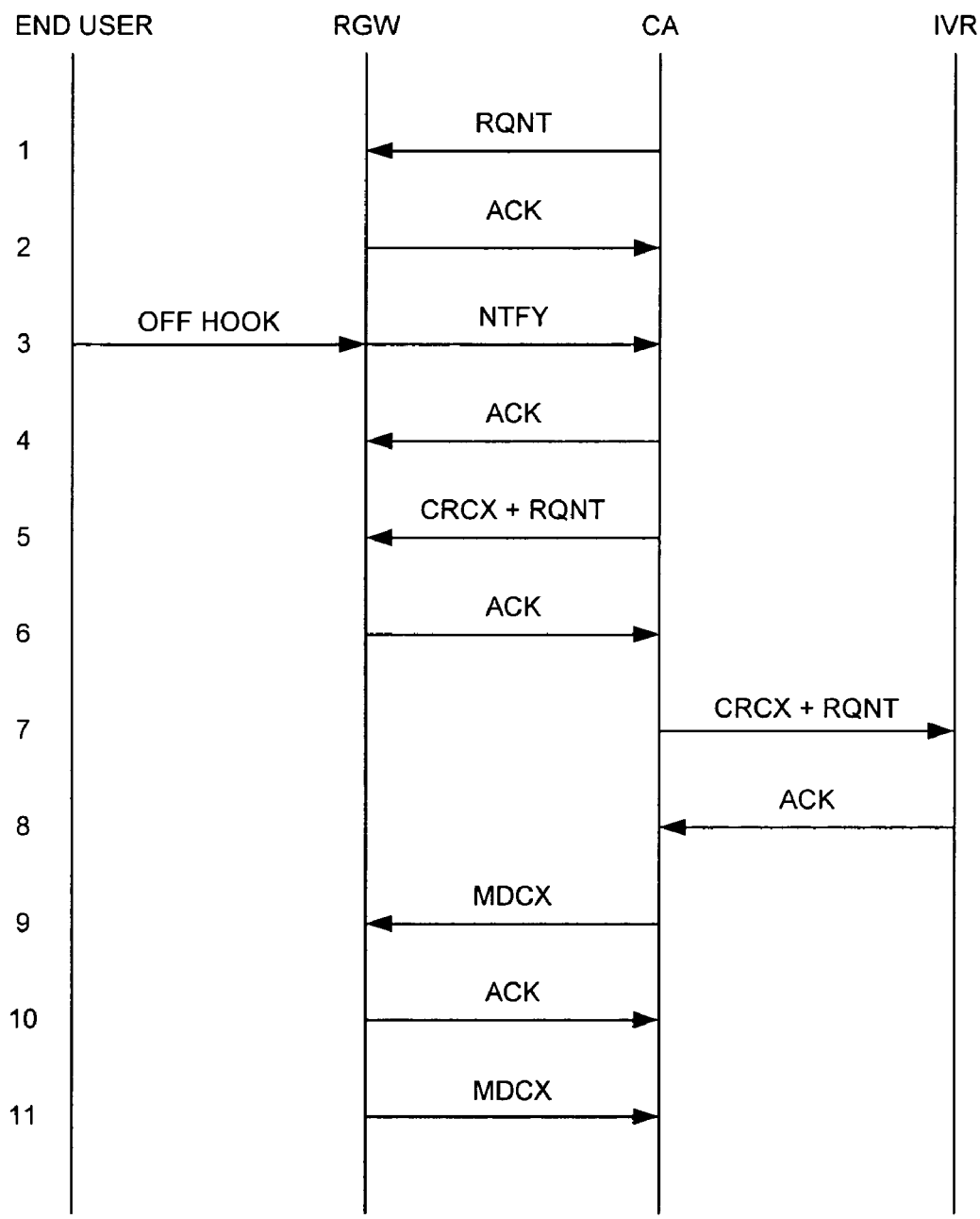
FIG. 3 is a call flow diagram illustrating an exemplary call flow between a residential gateway and an audio server implementing an interactive voice response (IVR) function.

FIG. 3 illustrates an exemplary call flow between a residential gateway and a call server implementing an IVR function. The call flow is explained in the context of the MGCP protocol. However, as will be explained in more detail below, the methods and systems for providing access to stored audio data are not limited to the MGCP protocol.

In the first line of the call flow, the call agent sends a notification request command (RQNT) to the gateway. The RQNT command is used to request that the gateway send notification to the call agent upon the occurrence of specified events in an endpoint or to request the performance of specified events. For example, the call agent can request to be notified when a specified circuit connected to the residential gateway goes off hook. The event or events for which notification is requested are specified in the parameters of the RQNT command.

In line 2, the gateway acknowledges the RQNT command by sending an acknowledge (ACK) message to the call agent. The ACK message includes the transaction ID that the call agent attached to the RQNT command.

In line 3, when the off-hook event is detected, the gateway notifies the event to the call agent, by sending a Notify (NTFY) message to the call agent. The NTFY message includes a parameter that indicates the observed event to the call agent. In this example, the observed event is the off-hook event on a specified circuit connected to the residential gateway.

In line 4, the call agent acknowledges the notification by sending an acknowledge (ACK) message to the gateway. In line 5, the call agent seizes the incoming circuit, i.e., the circuit for which the off-hook event occurred, and creates a connection with the endpoint using the CRCX command. The CRCX command piggy-backs an RQNT command that instructs the gateway to watch for an on-hook condition. In line 6, the gateway acknowledges the create connection (CRCX) command, sending back the identification of the newly created connection and session description used to receive audio data. For audio services, the session description can include the IP address of the endpoint, the type of audio media, a list of formats that the gateway will accept, etc.

In line 7, the call agent, having seized the incoming trunk and decided that the call has to be terminated on the IVR and that a script will be executed, sends a CRCX command to the IVR. The CRCX command is sent to a generic endpoint of the IVR, requesting that the IVR pick one of its available ports. In line 8, the IVR acknowledges the CRCX command, sends the identification of the selected endpoint, the connection identifier and the session description, and its own parameters, such as address, ports, and RTP profile.

In line 9 of the call flow, the call agent relays the information to the residential gateway using the modify connection (MDCX) command. In line 10, the gateway acknowledges the modification, using an ACK message. At this point, the caller is ready, a duplex path has been established between the caller and the IVR, all the resources have been allocated, and the call agent has to trigger script execution. In line 11, the call agent triggers script execution at the IVR by sending an MDCX message with an embedded RQNT command to the IVR. The message contains the script, specified by a url, to be executed by the IVR. For example, the script can play an announcement and/or request digits from the end user. At this point, the caller is interacting with the IVR. It is this interaction in which the methods and systems for providing access to stored audio data according to the present invention can be used. For example, the IVR in FIG. 3 can be replaced with an audio server according to the present invention, and the call agent can control the audio server to play audio, record audio, and collect digits from end users, using the audio server package according to the present invention, as set forth below.

Overview of Audio Server Package

The present invention includes an audio server package that specifies events, signals, parameters, and data structures that facilitate access to audio data managed by an audio server. This event package provides support for the standard IVR operations of Play Announcement, Play Collect, and Play Record. It supports direct references to simple audio as well as indirect references to simple and complex audio. It provides audio variables, control of audio interruptibility, digit buffer control, special key sequences, and support for reprompting during data collection. It also provides an arbitrary number of user-defined qualifiers to be used in resolving complex audio structures. For example, the user could define qualifiers for any or all of the following: language, codec, audio file format, voice talent, or customer. Additional packages may be defined that support Advanced Speech Recognition (ASR) and conferencing.

The following syntax supports both simple and complex audio structures. A simple audio structure might be a single announcement such as "Welcome to Bell South's Automated Directory Assistance Service". A more complex audio structure might consist of an announcement followed by a voice variable, followed by another announcement. For example, in "There are thirty-seven minutes remaining on your prepaid calling card," "There are" is a prompt, the number of minutes is a voice variable, and "minutes remaining on your prepaid calling card" is another prompt. It is also possible to define complex audio structures that are qualified by user-defined selectors such as language, codec, audio file format, gender, accent, customer, or voice talent. For instance, if the above example were qualified by language and accent selectors, it is possible to play "There are thirty seven minutes remaining on your prepaid calling card" in English spoken with a southern accent or in English spoken with a mid-western accent, providing that the audio to support this had been provisioned.

According to the present invention, there are two methods of specifying complex audio. The first is to directly reference the individual components. This requires a complete description of each component to be specified via the protocol. The second method is to provision the components on the audio server as a single entity and to export a reference to that entity to the call agent. In this case, only the reference (plus any dynamic data required, such as a variable data) is passed via the protocol, and no specification of individual components is necessary.

The audio server package according to the present invention provides significant functionality, most of which is controlled via protocol parameters. Most parameters are optional, and wherever possible, default to reasonable values. An audio application that references to provisioned, complex audio structures, and which takes advantage of parameter optionality and defaults, can specify audio events using a minimum of syntax.

The audio server package according to the present invention can be implemented in hardware, software, or a combination of hardware and software. For example, the audio server package can be implemented in software on an audio server that resides below the application level to allow applications to access stored audio data using the events and parameters in the audio server package.

Figure 4:
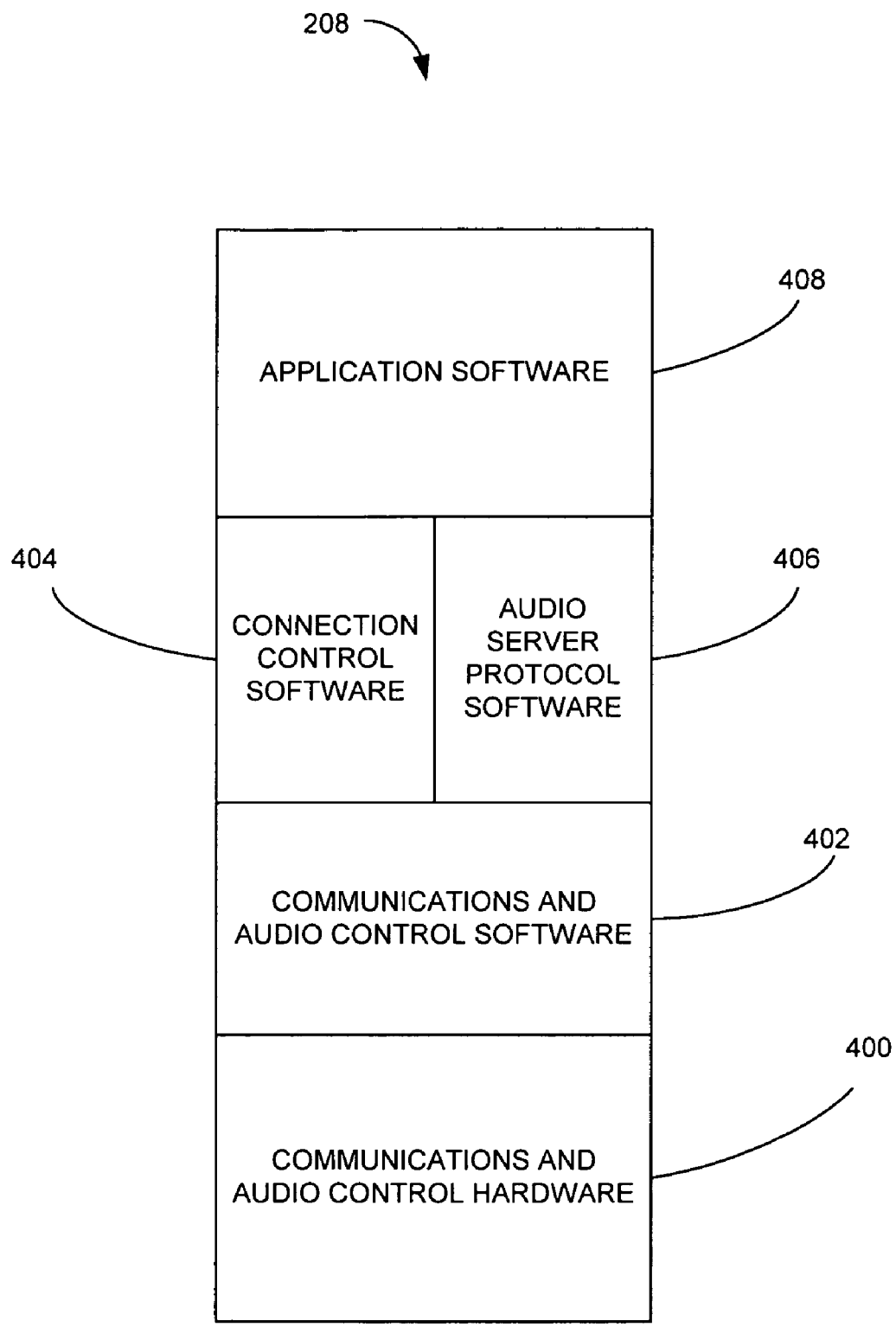
FIG. 4 is an architectural diagram illustrating audio server hardware and software according to an embodiment of the present invention.

FIG. 4 is a simplified block diagram illustrating hardware and software associated with audio server 208. In FIG. 4, audio server 208 can include communications and audio hardware 400 for communicating over packet-based and circuit-based networks and performing audio-related functions. For example, audio hardware 400 can include a processing unit that operates under control of a program stored in memory for providing access to stored audio data according to embodiments of the present invention. Hardware 400 can also include network communications adapters for communicating over Ethernets and ATM networks. Audio hardware 400 can include suitable speech and text processors for performing advanced speech recognition and text-to-speech functions.

Communications and audio software 402 provides device drivers and programming interfaces for communications and audio hardware 400. Connection control software 404 can implement a standard connection control protocol, such as MGCP, for communication over a telecommunication network. Audio server protocol software 406 consists of events and parameters that allow applications, such as application 408 to conveniently access stored audio data. Audio server 208 preferably also includes audio server database management software (not shown) for managing an audio server database that stores audio data files. Because the audio server protocol software according to the present invention preferably resides below the application level, the audio server protocol software provides convenient access to stored audio data to a variety of applications. Thus, unlike conventional announcement services that are narrowly tailored to deliver a particular announcement, such as those provided by banks to communicate account information to customers, the audio server protocol according to the present invention can be used in a variety of applications.

Figure 4A:
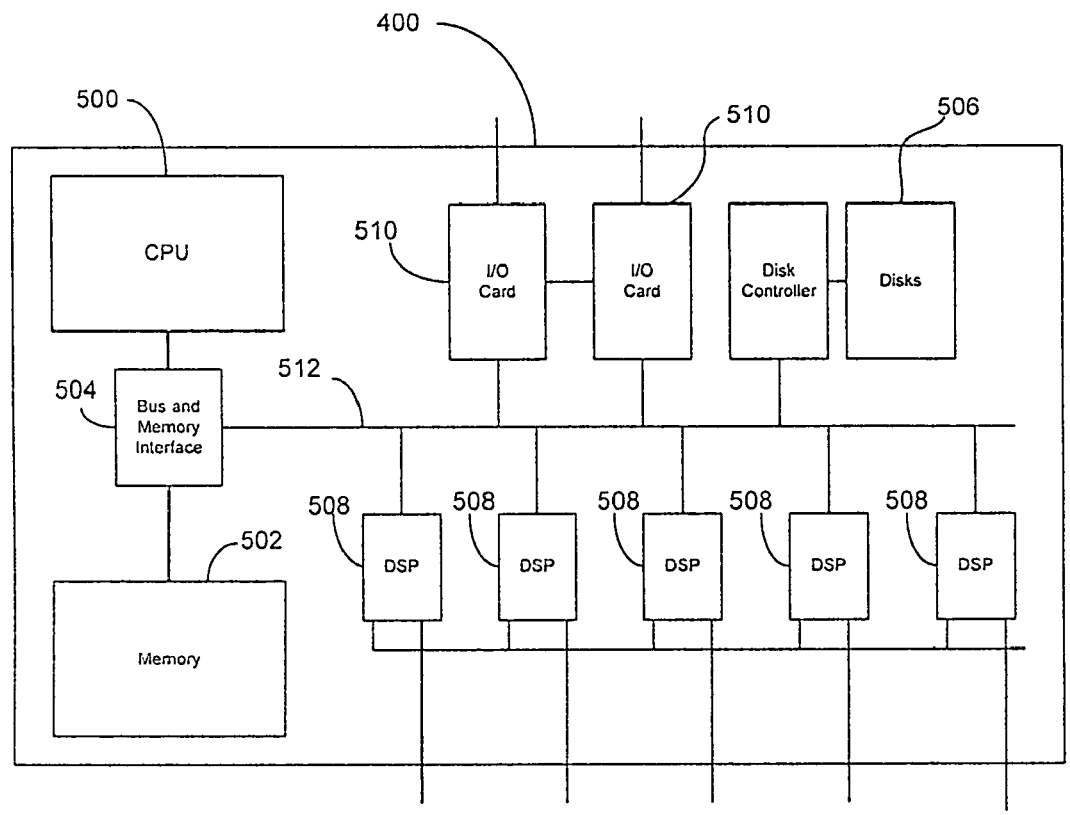

FIG. 4(a) is a block diagram of communications and audio hardware 400 associated with an audio server. In FIG. 4(a), the communications and audio hardware includes a CPU 500 for controlling operations of the audio hardware. The CPU 500 may be programmed to execute the methods and systems for providing access to stored audio data according to the present invention. For example, the methods and systems for providing access to stored audio data according to the present invention may be stored in a memory 502 connected to the CPU 500 through a bus and memory interface 504. Disks 506 store audio files to be played to end users. The CPU 500 retrieves audio files from disks 506 under control of instructions stored in memory 502. DSP cards 508 process audio files retrieved from memory 502 and transfer the audio files to external fabric. For example, if the external fabric is the public switched telephone network, then the DSP card may be a primary rate interface (PRI) card. If the fabric is an IP network, the DSP card may a voice over IP gateway card for encoding the audio file in RTP/RTCP format. Communication cards 510 receive requests for playing stored audio data. For example, communication cards 510 may comprise Ethernet cards for receiving requests over an Ethernet. I/O bus 512 allows the CPU to communicate with I/O devices.

In operation, when a request for playing stored audio data is received by I/O cards 510, the CPU 500 extracts audio files from the disks 506. The DSP cards 508 convert the audio files into the appropriate format and transmit the audio files to external devices. The methods and systems for providing access to stored audio data according to the present invention allow external devices to access complex audio data structures stored in the audio server database, which may be embodied in the disks 506.

The methods and systems for providing access to stored audio data according to the present invention will be described in the context of flow charts and computer-executable instructions. The computer-executable instructions may be embodied in a computer-readable medium, such as the memory 502 to provide access to stored audio data on disks 506. Alternatively, the computer-executable instructions may be embodied in an external storage device, such as a magnetic disk or an optical disk to provide access to stored audio data. In yet another alternative, the computer-executable instructions may be embodied in electrical signal downloadable over a network, such as the Internet. Thus, as used herein, the phrase "computer-readable medium" is intended to include electrical, magnetic, and optical storage media, as well as electrical signals.

Sequences

The syntax for accessing stored audio data according to the present invention includes abstractions of set and sequence and multilanguage variables for storing and referencing audio data. A sequence is a provisioned data structure containing one or more audio segments. As stated above, an audio segment is the atomic unit of stored audio, uniquely identifiable by an audio identifier. A "provisioned" data structure is a data structure that is stored in the database before a request from a call agent arrives, e.g., when the audio server database was created. Methods and systems for provisioning audio data on audio servers and on gateways is described in a commonly-assigned U.S. patent application entitled, "Methods and Systems for Building and Distributing Audio Packages", filed on even date herewith, the disclosure of which is incorporated herein by reference in its entirety.

The component segments of a sequence can be of the same type or of a different type. Every sequence is assigned a unique audio identifier. On playback, an audio identifier reference is deconstructed into its individual parts, i.e., the individual segments that make up the sequence, and each of the segments is played in order.

Figure 5:
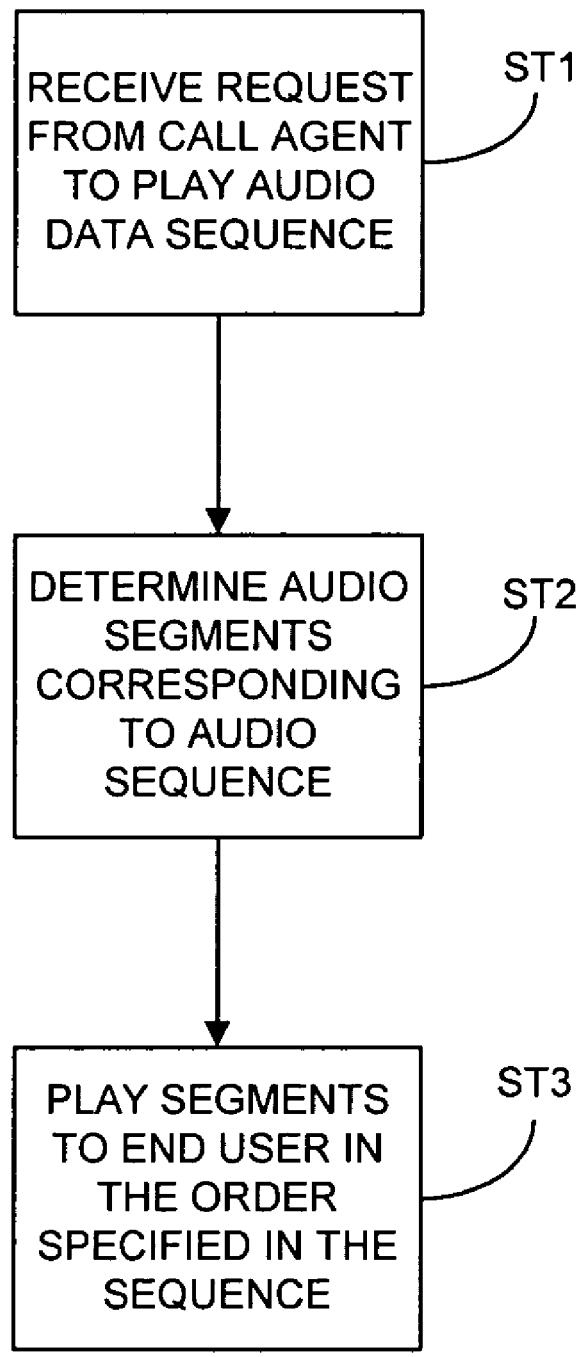
FIG. 5 is a flow chart illustrating exemplary steps that can be performed by a sequence processor according to an embodiment of the present invention.

FIG. 5 illustrates exemplary steps that can be performed by a sequence processor of an audio server in responding to a request for audio data and playing a sequence of audio data to an end user. The steps illustrated in FIG. 5 can be performed after a connection has been established between endpoints, for example, as illustrated in FIG. 3. In step ST1, the sequence processor receives a request from a call agent to play an audio data sequence. The request can be MGCP-compliant, e.g., a NotifyRequest command with a signal request parameter specifying the playing of an announcement. However, unlike MGCP, the request includes the audio identifier number corresponding to the audio sequence. In step ST2, the sequence processor determines the audio segments corresponding to the audio sequence. This action can be performed by accessing a look-up table containing sequences corresponding to audio segment numbers. In step ST3, the sequence processor plays the segments to the end user in the order specified in the sequence. In a packet-based network, playing the audio to the end user can include sending packets of audio to the end user through a gateway in a format previously agreed upon by the gateway. The gateway converts the audio into an analog signal and plays the signal to an end user.

In order to allow referencing of a sequence at runtime, the list of segments in the sequence must be stored in memory, such as hard disk storage, accessible by the audio server at some time before the referencing occurs, e.g., at provisioning time. For example, at provisioning time, a sequence is assigned a unique audio identifier. The list of segments in the sequence are referenced by the unique audio identifier. Each segment in the sequence also has a unique audio identifier. At runtime, the audio server accesses the list according to the unique audio identifier for the sequence and accesses the individual audio segments according to the segment audio identifiers in the list for the individual pieces of audio. In this manner, complex audio data can be referenced and played at runtime by referring to an audio identifier. This increases the flexibility at which audio can be delivered to the end user.

The usefulness of providing access to provisioned audio sequences using a unique audio identifier can be illustrated. For example, audio identifier 1234 can indicate a sequence that contains segments 1001, 1002, and 1003. Segment 1001 can be, "The current time is". Segment 1002 can be a variable that contains the current time. Variables are audio segments that are resolved at runtime and will be explained in more detail below. Segment 1003 can contain an advertisement for the company that provided the time service. Sequence number 1235 can contain segments 1001 and 1002. However, segment 1003 can be replaced by segment 1004, which contains a different ad for the same company or for a different company than segment 1003. Thus, sequences allow access to arbitrarily complex audio data through a unique identifier.

Sets

In addition to sequences, the present invention provides another new data structure for audio servers referred to as a set. A set is a provisioned collection of audio segments with an associated selector. A set is referenced by a unique audio identifier, in a manner similar to sequences. However, unlike sequences, an additional parameter, referred to as a selector, is used to select a member within a set for playback.

Selector types are supported by the syntax, but individual selector types can be defined by the user. For example, a user can define one or more of the following selector types: language, codec, audio file format, gender, accent, customer, and voice talent. These selector types are merely illustrative. Sets include almost any user-defined structure accessible through a unique audio identifier and a selector. For each selector type, the user must define a range of valid values. The user can also define a default value. If a selector value is not supplied at runtime then the default value is used. For example, a user can define a selector of type language as well as a set of legal values for that selector consisting of English, French, and Russian, and that the user has set English to be the default value. The user can also provision English, French, and Russian versions of a particular prompt, for instance "Please enter your id." At runtime, a reference to the set with the selector set to Russian would result in the Russian version of the prompt being played. A reference to the set with no selector would result in the English version of the prompt being played since English has been set as the default.

Selectors and Variables

Selector types are definable by the user and can apply to an individual segment within an operation or to all the segments in an operation. For each selector type, the user must also define a range of values that the selector can assume. For example, if the user defines a selector of type "language", the user might also define "hopi", "apache", and "cherokee" to be legal values for that selector. This implies that if the selector is to be used then audio in the Hopi, Apache, and Cherokee languages must be provisioned. The three-letter codes defined in ISO standard 639, "Code For The Representation Of Names Of Languages", Version 2, 1988, can be used as values for user-defined language selectors. An excerpt from ISO standard 639 follows:

TABLE 3

| Code for Names of Languages | |
|---|---|
| Code | Language |
| ipk | Inupiak |
| por | Portuguese |
| tam | Tamil |

Selectors can apply to entire operations or to a segment within an operation. If an operation contains multiple segments, each segment can have its own set of selectors. If selectors for an individual segment and selectors for the entire operation are present, the selectors for the individual segment takes precedence for that segment. The selectors for the operation apply to all segments within that operation that do not have individual segment selectors. If a selector set is not specified, provisioned defaults are used.

Figure 6:
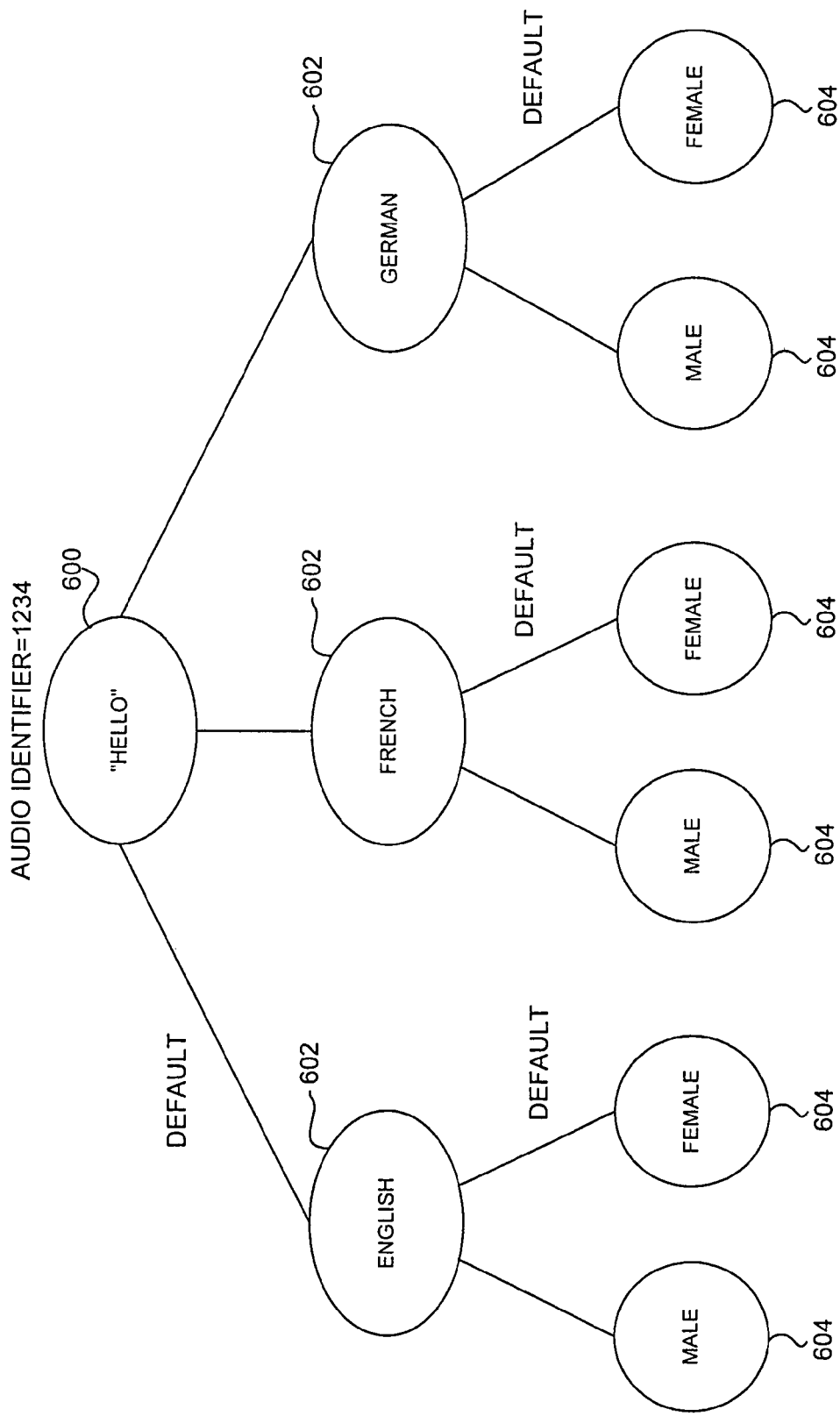
FIG. 6 is a tree diagram illustrating an exemplary set data structure for providing access to stored audio data according to an embodiment of the present invention.

FIG. 6 is a tree diagram illustrating an exemplary set data structure according to an embodiment of the present invention. The set data structure can be created and stored in the audio server database at provisioning time.

In FIG. 6, uppermost node 600 or "trunk" in the tree diagram represents the set and is identified by a unique identification number. In the illustrated embodiment, the uppermost node represents the content of an audio message, e.g., "Hello". Intermediate nodes 602 or "branches" in the tree diagram represent intermediate qualifiers for the set. In the illustrated embodiment, the intermediate nodes represent different languages in which to play an audio segment, e.g., French, English or German. Lowermost nodes 604 in the tree diagram or "leaves" represent actual audio segments. In the illustrated embodiment, the leaves specify the gender in which an audio segment will be played to the user.

In order to traverse the tree diagram in FIG. 6, a call agent specifies the identification number of the set, such as 1234, and a selector that specifies how to traverse the tree. Default paths are preferably provided at each level, such that a reference to the set only or a selector that specifies a partial path through the tree can be resolved to an audio segment to be played- to the end user. In order to request that a male French "Hello" be played to the user, the call agent can send the following request to the audio server:

S: pa(an = 1234) [FR, MALE]

In the protocol message, "S" indicates that the audio server is to perform the requested event. "pa" indicates that the audio server is to play an announcement. "1234" is the audio identifier for the set. The parameters within the brackets represent the selector for traversing the set. If a partial selector is specified, such as "[FR]", the segment will be played in French in the default voice of female. If no selector is specified, defaults will be supplied at both levels above the trunk, such that the message is played in an English, female voice.

Figure 7:
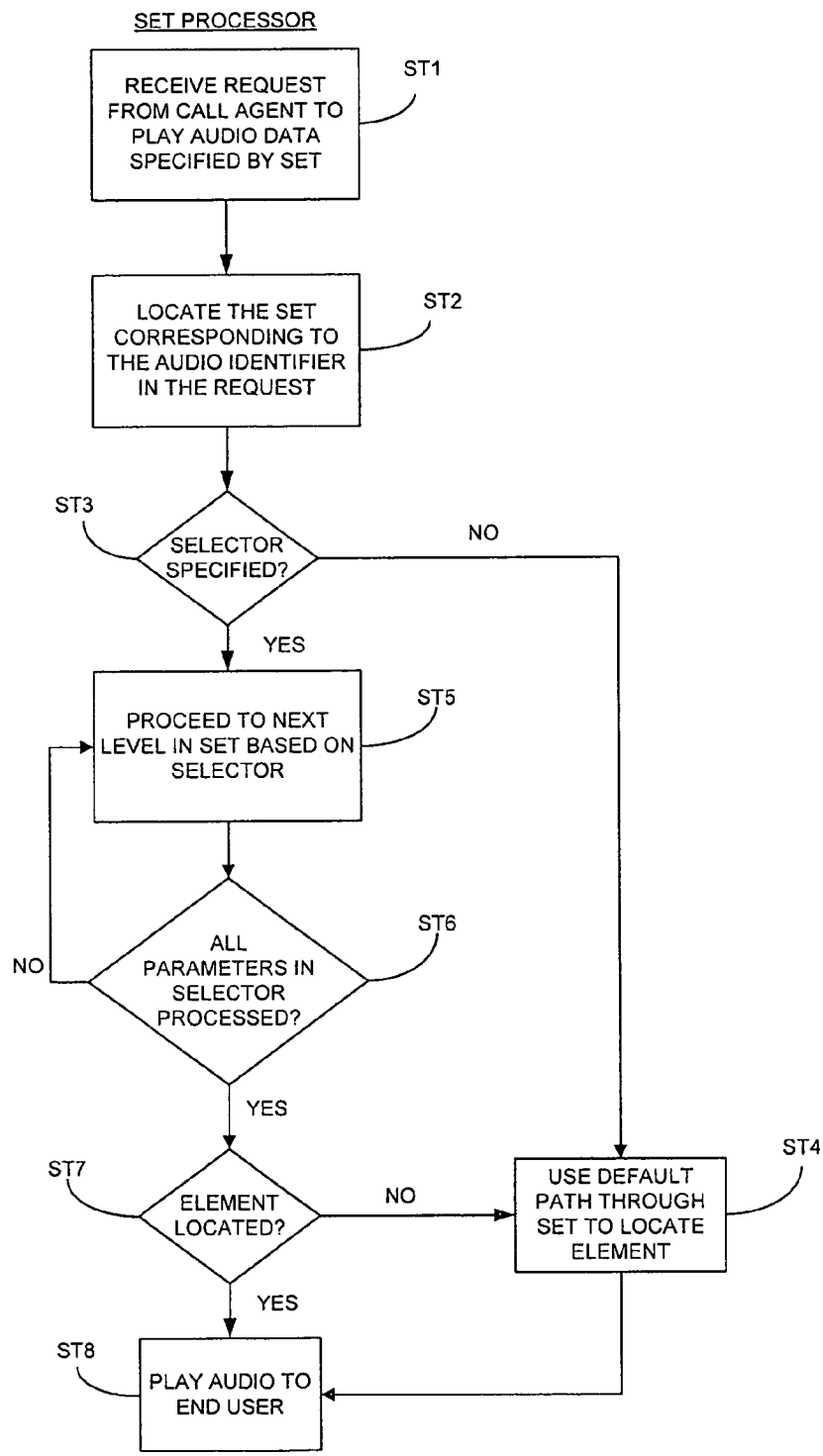
FIG. 7 is a flow chart illustrating exemplary steps that can be performed by a set processor according to an embodiment of the present invention.

FIG. 7 is a flow chart illustrating exemplary steps that can be performed by a set processor of an audio server in resolving a request for playing stored audio data specified by a set. The steps illustrated in FIG. 7 can be performed after a connection has been established between a call agent and the audio server, for example, as illustrated in FIG. 3.

In step ST1, the set processor receives a request for playing stored audio data. The request can be included in the signal request parameter of the NotifyRequest command, as described above. The request can include the audio identifier for the set and a selector for identifying an element in the set. The selector can include multiple parameters, corresponding to the number of levels in the set. In step ST2, the set processor locates the set corresponding to the audio identifier in the request received from the call agent. In step ST3, the set processor determines whether a selector was included in the request. If a selector was not included in the request, the set processor locates the default set element and plays the audio corresponding to the default set element to the end user (steps ST4 and ST5).

In step ST3, if the set processor determines that a selector is included in the request, the set processor proceeds to the next level in the set (step ST5). In step ST6, the set processor determines whether all parameters in the selector have been processed. If all parameters in the selector have not been processed, the set processor repeats steps ST5 and ST6 until all parameters in the selector have been processed. In step ST7, once all parameters in the selector have been processed, the set processor determines whether a set element has been located. If a set element has not been located, a partial selector was specified. Accordingly, the set processor locates a default element for the remaining unspecified levels and plays the audio to the end user (steps ST4 and ST5). In step ST7, if an element is located, a full selector was specified, and the set processor plays audio to the end user (step ST5).

The use of sets and selectors provides increased flexibility in accessing audio data and facilitates design of application software. For example, telecommunications service providers can provision sets in the audio server database tailored to the needs of their subscribers. Application software running on the call agent could play audio to specific subscribers simply by sending a message containing an audio identifier and a selector to the audio server.

Recursive Sets and Sequences

According to another aspect of the invention, sets and sequences can be defined recursively in the audio server database and are accessible through unique audio identifiers in the audio server protocol. For example, exemplary recursive data structures that can be provided in the audio server database include a set of sets, a sequence of sequences, a sequence of sets, or a set of sequences. Thus, the audio server database can include recursive definition of both sets and sequences and intermixing of sets and sequences. In addition, any number of levels of recursion is intended to be within the scope of the invention. For example, a set of sets of sequences can be stored in the audio server database. Each of these recursive data structures is accessible using a single unique audio identifier, in the manner specified above for sequences and sets. If a recursive data structure contains sets, selectors can be specified in a protocol message for each set.

Segment Types

The present invention includes the following segment types:

| | |
|---|---|
| RECORDING: | A reference by unique audio identifier to a single piece of recorded audio. |

RECORDINGs can be provisioned or they can be made during the course of a call. A RECORDING made during the course of a call can be temporary or persistent. A temporary RECORDING lasts only for the life of the call during which it was recorded. A persistent RECORDING lasts beyond the life of the call during which it was recorded.

A provisioned RECORDING can be replaced (or overriden) by a persistent RECORDING. A reference to the audio identifier of the provisioned RECORDING will then resolve to the persistent RECORDING. The overriding persistent audio can subsequently be deleted and the original provisioned audio can be restored.

A provisioned RECORDING can be overriden more than once. In this case, the audio identifier of the provisioned RECORDING refers to the latest overriding RECORDING. When the overriding RECORDING is deleted, the original provisioned RECORDING is restored, even if the segment has been overriden multiple times.

| | |
|---|---|
| TEXT: | A reference to a block of text to be converted to speech or to be displayed on a device. Reference can be by unique audio identifier to a block of provisioned text or by direct specification of text in a parameter. |
| SILENCE: | A specification of a length of silence to be played in units of 100 milliseconds. |
| TONE: | The specification of a tone to be played by algorithmic generation or by recording. |
| VARIABLE: | The specification of a voice variable by the parameters of type, subtype, and value. Specification of variables is considered in more detail below. |
| SEQUENCE: | As discussed above, a sequence is a reference by unique audio identifier for a provisioned sequence of mixed RECORDING, TEXT, SILENCE, TONE, VARIABLE, SET, or SEQUENCE segments. |

SET: As discussed above, a set is a reference by unique audio identifier and a selector to a provisioned set of segments. The selector is used at runtime to resolve the set reference to a specific element of the set. The elements of a set can include one or more of the following segment types: RECORDING, TEXT, TONE, SILENCE, SEQUENCE, or SET. Specific selector types are not specified by the protocol and must be defined by the user.

Audio Server Package

According to another aspect, the present invention includes an audio server package that is compliant with MGCP format for event packages, as discussed above.

The package name for the audio server package according to the invention is "A". The audio server package is comprised of events, parameters, and variable qualifiers. All identifiers are case sensitive. Table 4 shown below illustrates events and parameters of the audio server package according to the present invention.

TABLE 4

Audio Server Event Package

| Symbol | Definition | R | S | Duration |
|---|---|---|---|---|
| pa(parms) | Play Announcement | | TO | variable |
| pc(parms) | Play Collect | | TO | variable |
| pr(parms) | Play Record | | TO | variable |

In Table 4, entries in the column labeled "Symbol" indicate textual symbols that can be included in protocol messages sent from a call agent to an audio server to access stored audio data. Each symbol can include one or more optional parameters, which will be described in more detail below. The column labeled "Definitions" includes entries specifying definitions for the events of the audio server package. The events provided by the audio server package are defined as follows:

| | |
|---|---|
| Play Announcement: | Plays an announcement in situations where there is no need for interaction with the user. Because there is no need to monitor the incoming media stream, this event is an efficient mechanism for treatments, informational announcements, etc. |
| Play Collect: | Plays a prompt and collects dual tone multifrequency (DTMF) digits entered by a user. If no digits are entered or an invalid digit pattern is entered, the user can be reprompted and given another chance to enter a correct pattern of digits. The following digits are supported: 0-9, *, #, A, B, C, D. |
| Play Record: | Plays a prompt and records user speech. If the user does not speak, the user can be reprompted and given another chance to record. |

All three events carry an implicit request for notification, which results in a NTFY message being sent by the audio server when the announcement has finished playing normally or due to an error.

In Table 4, the entries in the column labeled "S" indicate that the events are actions that the call agent requests the audio server to perform. The entries in this column also indicate that each of the events is a timeout event, as explained above. The entries in the column labeled "Duration" indicate that each of the events is of variable duration.

Event Parameters

The Play Announcement, Play Record, and Play Collect events can each be qualified by a string of parameters, most of which are optional. Where appropriate, parameters default to reasonable values. The only event with a required parameter is Play Announcement. If a Play Announcement event is not provided with a parameter specifying some form of playable audio, an error is returned to the application. The event parameters for the audio server package are defined as follows:

TABLE 5

Event Parameters for the Audio Server Package

| Symbol | Definition | pa | pc | pr |
|---|---|---|---|---|
| tss | text to speech | x | x | x |
| dts | display text | x | x | x |
| sis | silence | x | x | x |
| tns | tone | x | x | x |
| vbs | variable | x | x | x |
| an | announcement | x | | |
| ip | initial prompt | | x | x |
| rp | reprompt | | x | x |
| nd | no digits reprompt | | x | |
| ns | no speech reprompt | | | x |
| fa | failure announcement | | x | x |
| sa | success announcement | | x | x |
| ni | non-interruptible play | | x | x |
| it | iterations | x | | |
| iv | interval | x | | |
| du | duration | x | | |
| sp | speed | x | x | x |
| vi | volume | x | x | x |
| cb | clear digit buffer | | x | x |
| mx | maximum # of digits | | x | |
| mn | minimum # of digits | | x | |
| dp | digit pattern | | x | |
| fdt | first digit timer | | x | |
| idt | inter digit timer | | x | |
| edt | extra digit timer | | x | |
| prt | pre-speech timer | | | x |
| pst | post-speech timer | | | x |
| trt | total recording length timer | | | x |
| rsk | restart key | | x | x |
| rik | reinput key | | x | x |
| rtk | return key | | x | x |
| psk | position key | | x | x |
| stk | stop key | | x | x |
| sik | start input key | | x | |
| eik | end input key | | x | x |
| iek | include end input key | | x | |
| na | number of attempts | | x | x |
| rp | record persistent audio | | | x |
| oa | override audio | | | x |
| ra | restore audio | | | x |

In Table 5, the entries in the column labeled "Symbol" indicate textual symbols for each parameter that can be used in protocol messages in communications between a call agent and an audio server. The entries in the column labeled "Definition" briefly describe each symbol. The column labeled "pa" indicates parameters for the play announcement event. The column labeled "pr" indicates parameters for the play record event. The column labeled "pc" indicates parameters for the play collect event.

Parameters to the audio server package events are defined as follows:

| | |
|---|---|
| Text To Speech: | Specifies a text string to be converted to speech. |
| Display Text: | Specifies a text string to be displayed on a device. |
| Silence: | Specifies a length of silence to be played in units of 100 milliseconds. |
| Tone: | Specifies a tone to be played by algorithmic generation or recordation. |
| Variable: | Specifies a voice variable by type, subtype, and value. |
| Announcement: | An announcement to be played. Consists of one or more audio segments. |
| Initial Prompt: | The initial announcement prompting the user to either enter DTMF digits or to speak. Consists of one or more audio segments. If not specified, the event immediately begins digit collection or recording. |
| Reprompt: | Played after the user makes an error, such as entering an invalid digit pattern or not |

-continued

| | |
|---|---|
| No Digits Reprompt: | speaking. Consists of one or more audio segments. Defaults to Initial Prompt. Played after the user fails to enter a valid digit pattern during a Play Collect event. Consists of one or more audio segments. Defaults to Reprompt. |
| No Speech Reprompt: | Played after the user fails to speak during a Play Record event. Consists of one or more audio segments. Defaults to Reprompt. |

Cascaded Integral Error Handling

Error handling allows the call agent to specify actions for the audio server to take when the user makes an input error. For example, if the user errs in the entry of digits, the call agent can instruct the audio server to reprompt the user. Other protocols contain some integral error handling, however, no existing protocol discloses the concept of cascading default prompts.

Figure 8:
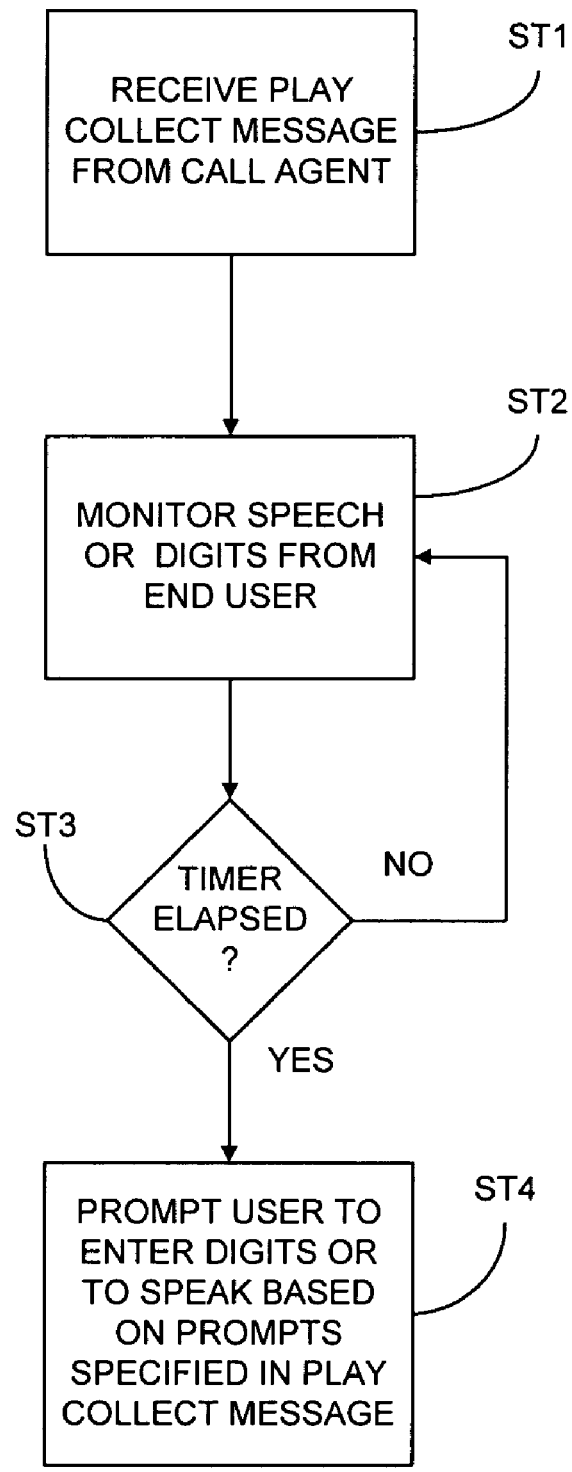
FIG. 8 is a flow chart illustrating exemplary steps that can be performed by an audio server in playing cascaded reprompts according to an embodiment of the present invention.

FIG. 8 illustrates an exemplary cascaded integral error handling procedure that can be performed by an audio server according to an embodiment of the present invention. In order to implement cascaded integral error handling, the call agent transmits a play collect message to the audio server to instruct the audio server to play an announcement and collect certain digits or speech from the user. The play collect message can also specify an initial prompt, reprompt, and/or a no digits reprompt.

In step ST1, the audio server receives the play collect message and determines how to proceed based on the parameters in the message. In steps ST2 and ST3, the audio server monitors digits or speech received from the user until a timer elapses. If the timer elapses and no digits have been received, the audio server prompts the user in accordance with the prompting parameters received in the play collect message (step ST4). For example, given an initial prompt, a reprompt, and a no digits or no speech prompt, if the call agent specifies all three, then all three will be used in the appropriate situation. However, if the call agent only specifies an initial prompt and a reprompt, in the no digits or no speech situation, then the reprompt would be used. If the call agent does not specify a reprompt, then the initial prompt would be used. Thus, the present invention provides methods by which a call agent can instruct the audio server using cascaded prompts in response to lack of user input.

| | |
|---|---|
| Failure Announcement: | Played when all data entry attempts have failed. Consists of one or more audio segments. No default. |
| Success Announcement: | Played when data collection has succeeded. Consists of one or more audio segments. No default. |
| Non-Interruptible Play: | If set to true, initial prompt is not interruptible by either voice or digits. Defaults to false. Valid values are the text strings "true", and "false." |
| Iterations: | The maximum number of times an announcement is to be played. A value of minus one indicates the announcement is to be repeated forever. Defaults to one if not specified. |
| Interval: | The interval of silence to be inserted between iterative plays. Specified in units of 100 milliseconds. Defaults to one second if not specified. |
| Duration: | The maximum amount of time to play and possibly replay an announcement. Takes precedence over iteration and interval. Specified in units of 100 milliseconds. No default. |
| Speed: | The relative playback speed of announcement specifiable as a positive or negative percentage variation from the normal play-back speed. |
| Volume: | The relative playback volume of announcement specifiable as a positive or negative percentage variation from the normal play-back volume. |
| Clear Digit Buffer: | If set to true, clears the digit buffer before playing the initial prompt. As used herein, the term "digit buffer" refers to a memory buffer maintained by the audio server to receive digits from the end user. Valid values are the text strings "true" and "false." The buffer parameter defaults to false. |
| Maximum # Of Digits: | The maximum number of digits to collect. Defaults to one. |
| Minimum # Of Digits: | The minimum number of digits to collect. Defaults to one. |
| Digit Pattern: | An extended regular expression specifying a digit collection pattern. Uses extended regular expressions as supported by the Rogue Wave Class Library, Tools.h++ Class Reference Version, Rogue Software, Inc., 1996, which supports a subset of the ANSI/IEEE Standard 1003.2 (Portable Operating System Interface) Version D11.2, September, 1991, for regular expressions. If not specified, pattern matching is not attempted. |

Most IVR protocols offer the ability to do some form of digit matching, however, none offer the ability to match DTMF digit patterns using regular expressions. Regular expressions themselves are widely used in computer science. The regular expression syntax is very compact and powerful, and allows the pattern of digits that the IVR is trying to recognize to be specified in detail. For simpler patterns, the audio server can perform pattern matching based on minimum and maximum digits.

Figure 9:
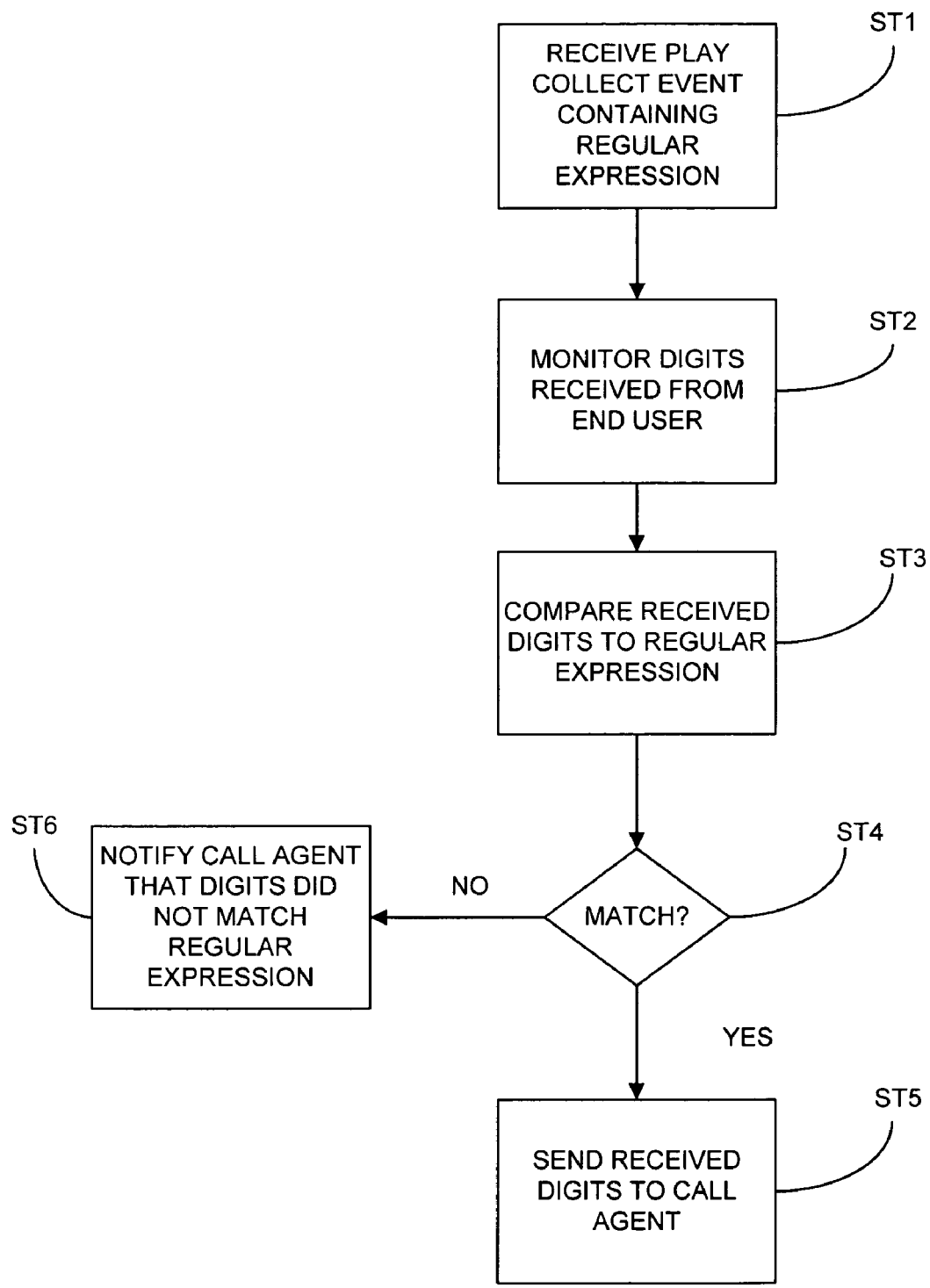
FIG. 9 is a flow chart illustrating exemplary steps that can be performed by an audio server in matching dual tone multifrequency (DTMF) digits using regular expressions according to an embodiment of the present invention.

FIG. 9 illustrates exemplary steps that can be performed by an audio server in matching DTMF digit patterns using regular expressions according to an embodiment of the present invention. At runtime, the call agent specifies a regular expression, which is sent to the audio server in a protocol message as part of the play collect event. The regular expression specifies that the audio server should collect a twelve digit number that starts with 4, the second digit of which is 5, 6, or 7, the third digit of which is anything but 5, 6, or 7, and the remaining digits of which are 0-9. The regular expression corresponding to this pattern according to Posix Basic Regular Expression notation is:

[4][567][^567][0-9]{9}

The audio server receives the play collect event (step ST1), monitors the digits entered by the user (step ST2), and compares the digits to the specified regular expression (steps ST3 and ST4). If the digits received from the user match the pattern specified in the regular expression, the audio server sends the digits back to the call agent (step ST5). If the user fails to enter a matching pattern, the audio server notifies the call agent that digit collection has failed (step ST6). Sending the digits back to the call agent or notifying the call agent can be accomplished using the MGCP Notify command, with the dialed digits communicated in the signaled event parameter. Thus, by allowing specification of digits to be collected using regular expressions, the present invention increases the flexibility audio server applications requiring digit collection.

| | |
|---|---|
| First Digit Timer: | The amount of time allowed for the user to enter the first digit. Specified in units of 100 milliseconds. Defaults to five seconds. |
| Inter Digit Timer: | The amount of time allowed for the user to enter each subsequent digit. Specified in units of 100 milliseconds or seconds. Defaults to three seconds. |
| Extra Digit Timer: | The amount of time to wait for a user to enter a final digit once the maximum expected amount of digits have been entered. Typically, this timer is used to wait for a terminating key in applications where a specific key has been defined to terminate input. Specified in units of 100 milliseconds. If not specified, this timer is not activated. |

The extra digit timer is used to wait for a terminating key in applications where a specific key has been defined to terminate input. This timer addresses the "# key ambiguity problem." For example, an application might be expecting 5 digits terminated by the # key, but the digits might be valid even if not terminated by the # key. If the digits are sent to the call agent as soon as the fifth digit is entered, the # key, when and if it is received, is ambiguous since it could be interpreted as a terminating key for the previously entered digits or as something else. The extra digit timer allows the ambiguity to be resolved according to when the extra digit was received.

Figure 10:
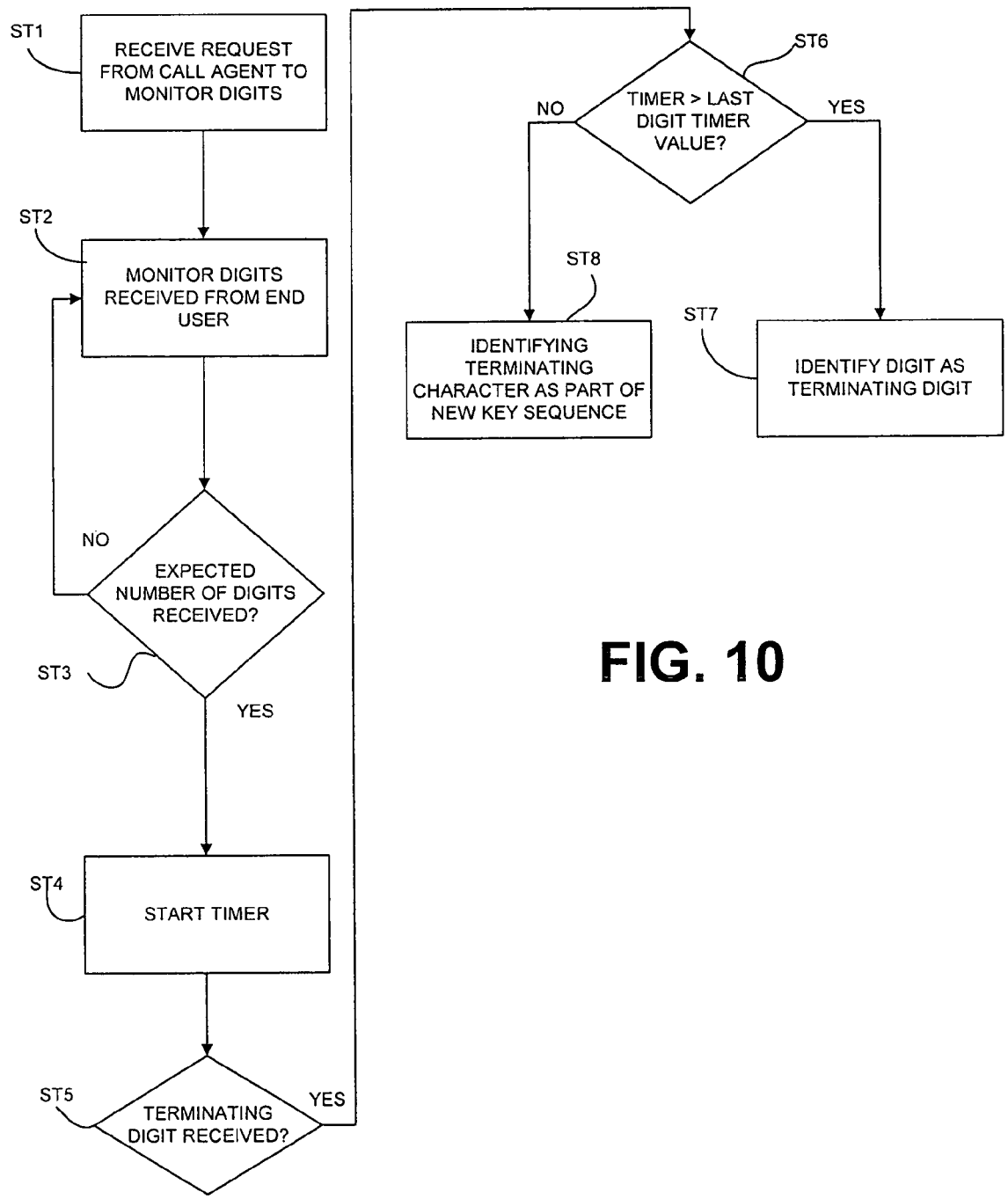
FIG. 10 is a flow chart illustrating exemplary steps that can be performed by an audio server in classifying a terminating character according to an embodiment of the present invention.

FIG. 10 illustrates an exemplary extra digit timer that can be implemented in an audio server according to an embodiment of the present invention. The call agent transmits a request to the audio server specifying a string of digits to be collected by the audio server and the time to wait for the terminating digit. The request can be an MGCP NotifyRequest command including the play collect event and the extra digits parameter.

In step ST1, the audio server receives the request for monitoring digits. In step ST2, the audio server monitors digits received from the user. In step ST3, the audio server determines whether the number of digits that are expected to be received have been received. If the expected number of digits have been received, the audio server starts a timer (step ST4). The audio server then determines whether a terminating digit, e.g., the "#" key, has been received (step ST5). If the terminating digit has not been received, the audio server continues to wait for the digit. As discussed above, the audio server can prompt the user for the terminating digit if it is not received within a predetermined time period. If the audio server receives the terminating digit, the audio server determines whether the timer exceeds the extra digit timer value received from the call agent (step ST6). If the extra digit timer value has not been exceeded when the terminating key is received, the audio server identifies the key as the terminating digit (step ST7). Identifying the key as the terminating key can include sending an MGCP Notify command to the call agent indicating that the user terminated entry of digits. If the extra digit timer value has been exceeded when the terminating key is received, the key is interpreted as part of another key sequence (step ST8). Thus, by allowing the call agent to specify an extra digit timer value to the audio server, the present invention removes ambiguity conventionally associated with terminating keys.

| | |
|---|---|
| Pre-speech Timer: | The amount of time to wait for the user to initially speak. Specified in units of 100 milliseconds. Defaults to three seconds. |
| Post-speech Timer: | The amount of silence necessary after the end of the last speech segment for the recording to be considered complete. Specified in units of 100 milliseconds. Defaults to two seconds. |
| Total Recording Length Timer: | The maximum allowable length of the recording, not including pre or post speech silence. Specified in units of 100 milliseconds. If not specified, this timer is not activated. |
| Restart Key: | Defines a key sequence consisting of a command key optionally followed by zero or more keys. For example, a command key can be the "*" key on a telephone keypad, and "*1" can indicate the restart key. This key sequence has the following action: discard any digits collected or recording in progress, replay the prompt, and resume digit collection or recording. No default. An application that defines more than one command key sequence will typically use the same command key for all command key sequences. If more than one command key sequence is defined, then all key sequences must consist of a command key plus at least one other key. |

A restart key can be any key or key sequence specified to the audio server that allows the user to restart a string of digits or a recording if the user errs in entering the digits or speaking the recording. For example, the asterisk key followed a 2 key can be used to stop entry of a recording and start a new recording. When the user enters the restart key, the audio server discards the previously recorded key sequence or recording and allows the user to start over. If the audio server receives a restart key, the audio server replays the prompt that requested the user to input the digits or record the recording.

| | |
|---|---|
| Reinput Key: | Defines a key sequence consisting of a command key optionally followed by zero or more keys. This key sequence has the following action: discard any digits collected or recording in progress and resume digit collection or recording. No default. An application that defines more than one command key sequence will typically use the same command key for all command key sequences. If more than one command key sequence is defined, then all key sequences must consist of a command key plus at least one other key. |

The reinput key causes the audio server to perform a similar function as the restart key, except that the prompt is not repeated. For example, when the user errs in entering a key sequence or recording a message, the user can press the reinput key to restart recording of the message or entering of the digits.

| | |
|---|---|
| Return Key: | Defines a key sequence consisting of a command key optionally followed by zero or more keys. This key sequence has the following action: terminate the current event and any queued event and return the terminating key sequence to the call processing agent. No default. An application that defines more than one command key sequence will typically use the same command key for all command key sequences. If more than one command key sequence is defined, then all key |

-continued sequences must consist of a command key plus at least one other key.

The return key terminates not only the current event being performed by the audio server, but also any event queued by the audio server. The return command allows the end user to terminate actions being performed by the audio server on behalf of the end user.

| | |
|---|---|
| Position Key: | Defines a key with the following action: stop playing the current announcement and resume playing at the beginning of the first, last, previous, next, or the current segment of the announcement. No default. |

The position key is processed by the audio server using sequences, as described above. For example, the position key can allow a user who is familiar with an announcement to skip the remainder of the current announcement and start playing the next announcement. Alternatively, a user who did not hear all or part of an announcement can repeat some or all of the announcement. Because an announcement can be a sequence of audio data having one or more segments uniquely identifiable by an audio identifier, playback of the sequence can be controlled using the position key and the audio identifiers of the segments in the sequence. A plurality of position keys can be defined that allow the user to access a variety of positions in a sequence. For example, "*1" can result in playback of the first segment of a sequence, "*2" can result in playback of the last segment in a sequence, "*3" can result in playing of the next segment in a sequence, etc. Thus, the audio server according to the present invention is capable of controlled playback of sequences using one or more position keys.

Figure 11:
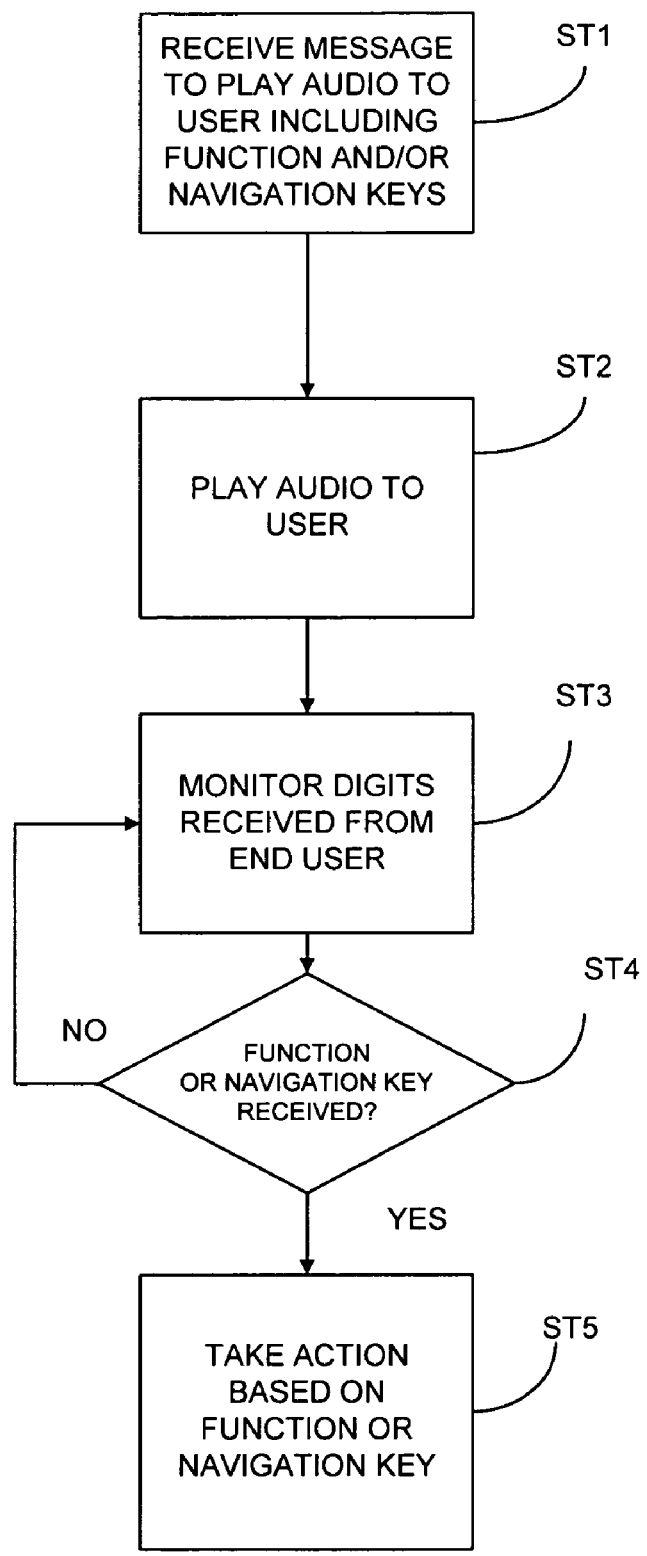
FIG. 11 is a flow chart illustrating exemplary steps that can be performed by an audio server in processing function and navigation keys according to an embodiment of the present invention.

FIG. 11 illustrates exemplary steps that can be performed by an audio server in processing function and navigation keys according to an embodiment of the present invention. In step ST1, the audio server receives a request from a call agent for playing audio data to a user. The request includes an audio identifier for a sequence of audio data segments to be played to the end user. The request also includes one or more function/navigation keys for allowing the user to control playing of the audio data sequence and/or collection of digits from the user. For example, the request can include a position key for playing a specific segment in the audio data sequence, a restart key for allowing the user to restart entry of digits, or any of the other key sequences described above. In step ST2, the audio server resolves the sequence and plays the sequence to the end user. In step ST3, the audio server monitors digits received from the end user. In step ST4, the audio server determines whether any of the digits is a function or navigation key defined in the request from the call agent. In step ST5, if the keys are function or navigation keys, the audio server takes the appropriate action based on the keys. For example, if the key is a position key requesting that the audio server play the first segment in a sequence, the audio server replays the first segment. If the key is a reinput key, the audio server discards previously-collected digits and allows the user to enter a new string of digits.

By allowing the user to control audio server functions using function and navigation keys specified by a call agent, the delivery of audio to an end user can be tailored to the user's needs. For example, a user who is familiar with parts of an audio data sequence can use position keys to play only selected parts of a sequence. When a user errs in inputting digits, the user can re-start the entry of digits without waiting for a reprompt. Thus, the present invention provides a user-friendly interface for audio server applications.

| | |
|---|---|
| Stop Key: | Defines a key with the following action: terminate playback of the announcement. No default. |
| Start Input Keys: | Defines a set of keys that are acceptable as the first digit collected. This set of keys can be specified to interrupt a playing announcement or to not interrupt a playing announcement. The default key set is 0-9. The default behavior is to interrupt a playing announcement when a Start Input Key is pressed. This behavior can be overriden by using the ni (Non-Interruptible Play) parameter. Specification is a list of keys with no separators, e.g., 123456789#. |
| End Input Key: | Specifies a key that signals the end of digit collection or voice recording. The default end input key is the # key. To specify that no End Input Key be used the parameter is set to the string "null". The default behavior is not to return the End Input Key in the digits returned to the call agent. This behavior can be overriden by the Include End Input Key (iek) parameter. |
| Include End Input Key: | By default, the End Input Key is not included in the collected digits returned to the call agent. If this parameter is set to "true" then the End Input Key will be returned with the collected digits to the call agent. Default is "false". |
| Number Of Attempts: | The number of attempts the user is given to enter a valid digit pattern or to make a recording. Defaults to one. Also used as a return parameter from the Play Collect and Play Record events giving the number of attempts the user made. |
| Record Persistent Audio: | If set to true, the recording that is made is persistent instead of temporary. Defaults to false. Valid values are the text strings "true" and "false". |
| Override Audio: | Indicates that the specified provisioned audio segment is to be overridden with a persistent audio segment to be recorded shortly. |
| Restore Audio: | Indicates that the provisioned audio segment originally associated with the specified audio identifier is to be restored and that the overriding persistent audio is to be deleted. |

Return Parameters

Each event has an associated set of possible return parameters which are listed in the following table.

TABLE 6

Return Parameters

| Symbol | Definition | pa | pc | pr |
|---|---|---|---|---|
| vi | voice interrupt | | | x |
| ik | interrupting key sequence | | x | |
| ap | amount played | | x | x |
| na | number of attempts | | x | x |
| dc | digits collected | | x | |
| ri | recording id | | | x |
| rc | return code | x | x | x |

The functions of the return parameters listed in Table 6 are as follows:

| | |
|---|---|
| Voice Interrupted: | Set to "true" if the initial prompt of a Play Record operation was interrupted by voice. Defaults of "false". |
| Interrupting Key Sequence: | Key or key sequence that interrupted the initial prompt of a Play Collect operation. |
| Amount Played: | The length played of an interrupted prompt, in 100 millisecond units. |
| Number Of Attempts: | The number of attempts the user needed to enter a valid digit pattern or to make a recording. Defaults to 1. |
| Digits Collected: | The DTMF digits that were collected during a Play Collect operation. |
| Recording ID: | A 32 bit binary integer assigned to audio recorded during the Play Record operation. |
| Return Code: | A return code giving the final status of the operation. Three ranges are defined: |
| Amount Played: | A return parameter from the Play Announcement, Play Collect, and Play Record events indicating the length of an interrupted announcement that was played before the interrupt. Specified in 100 millisecond units. |
| Digits Collected: | A return parameter from the Play Collect event indicating the digits that were collected. |
| Recording Id: | A return parameter from the Play Record event indicating the audio identifier of a recording that was made. Specified as a unique 32 bit binary integer. |

TABLE 7

Return Code Range

| Range | Meaning |
|---|---|
| 100-199 | successful completion |
| 200-299 | transient error |
| 300-399 | permanent error |

Examples of how return codes are used are listed below. These return codes can be sent from the audio server to the call agent to indicate how an action was completed. In the examples listed below, "O" indicates the observed event parameter that can be included in the MGCP NTFY message. "pa", "pc", and "pr", respectively, indicate the play announcement, play collect, and play record events, as defined in Table 4—Audio Server Event Package, and "rc" indicates the return code for the event.

The Play Announcement event completed successfully:

O: pa(rc=100)

The Play Announcement event failed:

O: pa(rc=300)

The Play Collect event completed successfully on the user's second attempt when the user entered the digits 04375182:

O: pc(rc=200,na=2,dc=04375182)

In this example, "na" is the number of attempts parameter and "dc" is the digits collected parameter for the play collect event.

The Play Record event was successful on the user's first attempt; the audio identifier of the recording made by the user is 983:

O: pr(rc=200,na=1,ri=983)

Variables

According to another aspect of the invention, variables can be used to access stored audio data. As used herein, a variable is a parameter that can be included in a protocol message that is resolved at runtime by the audio server into a single semantic concept. The present invention supports two kinds of variables—embedded variables and direct variables. Embedded variables are variables that have been provisioned as part of a segment. Direct variables are completely specified in the protocol message. Typically, embedded variables are provisioned along with recorded speech, e.g., "A representative will be with you in approximately 5 minutes. If you would prefer to leave a voice message, press 1 now." where the variable is the number of minutes. This kind of variable is often referred to as an embedded variable.

Variables are specified by the following parameters: type, subtype, and value. Variable types include date, money, number, time, etc. Subtype is a refinement of type. For example, the variable type money might have an associated range of subtypes such as dollar, rupee, dinar, etc. Not all variables require a subtype, and for these variables the subtype parameter should be set to null.

For embedded variables, only the value is specified since the type and subtype have been provisioned. In a list of segments, an embedded variable specification applies only to the segment that directly precedes it. If a segment has multiple embedded variables, the values must be given in the order in which the variables are encountered when the segment is played.

Some examples follow below:

An example of a protocol message including a direct variable is:

S: pa(an=vbs(mny,usd,1153))

In this example, "S" is the signaled events parameter that can be included in an RQNT command sent from a call agent to an audio server to request performance of a specified event. "pa" is the play announcement event. "an" is the announcement event. "vbs" indicates that a variable is specified. "mny" is the variable type, "usd" is the variable subtype, and 1153 is the value. Thus, in processing the example command, the audio server can play the announcement "eleven dollars and fifty-three cents". An example of a protocol message including an embedded variable is:

S: pa(an=37<1153>)

In this example, "37" specifies the audio identifier of the sequence in which a variable is embedded, and 1153 specifies the value for the variable. Thus, in processing this example, an audio server can play, "Your current account balance is eleven dollars and fifty-three cents".

Not all variables, such as the date variable shown in the next example, require a subtype. In that case, the subtype is encoded with the value "null":

S: pa(vn=vbs(dat,null,101598))

In some cases it can be desirable to play an announcement that contains an embedded variable without playing the variable itself. To do this a single "null" is provided for the value:

S: pa(an=37<null>)

An example of a situation in which it can be desirable to play an announcement with an embedded variable without playing the variable itself is: "Our office will be open this week on the following days: <var1> <var2> <var3> <var4> <var5>." If for a particular week the office is only open Monday and Thursday, the first two variables would be used and null arguments would be supplied for the last three variables.

Table 8 shown below illustrates exemplary variable qualifiers according to the present invention.

TABLE 8

Variable Qualifiers

| Symbol | Definition | Type | Subtype | Subtype of |
|---|---|---|---|---|
| dat | date | x | | |
| dig | digits | x | | |
| gen | generic | | x | dig |
| ndn | North American DN | | x | dig |
| dur | duration | x | | |
| mth | month | x | | |
| mny | money | x | | |
| num | number | x | | |
| crd | cardinal | | x | nm |
| ord | ordinal | | x | nm |
| sil | silence | x | | |
| str | string | x | | |
| txt | text | x | | |
| dsp | display text | | x | txt |
| spk | text to speech | | x | txt |
| tme | time | x | | |
| t12 | twelve hour format | | x | tme |
| t24 | twenty four hour format | | x | tme |
| ton | tone | x | | |
| wkd | weekday | x | | |

In Table 8, the entries in the column labeled "Symbol" indicate the textual symbols used in protocol messages from a call agent to an audio server to request that a variable be played. The column labeled "Definition" specifies a brief description for each variable. The columns labeled "Type" and "Subtype", respectively, indicate whether a given symbol specifies a type or a subtype for a given variable. The column labeled "Subtype of" indicates whether one variable is a subtype of another variable.

Parameters to the audio server package events for variables are defined as follows:

| | |
|---|---|
| Date: | Speaks a date specified as YYYYMMDD. For example, "10151998" is spoken as "October fifteenth nineteen ninety eight." |
| Digits: | Speaks a string of digits one at a time. If the subtype is North American DN, the format of which is NPA-NXX-XXXX, the digits are spoken with appropriate pauses between the NPA and NXX and between the NXX and XXXX. If the subtype is generic, the digits are spoken with no pauses. |
| Duration: | Duration is specified in seconds and is spoken in one or more units of time as appropriate, e.g. "3661" is spoken as "One hour, one minute, and one second". |
| Money: | Money is specified in the smallest units of a given currency and is spoken in one or more units of currency as appropriate, e.g. "110" in U.S. Dollars would be spoken "one dollar and ten cents." The three letter codes defined in ISO 4217, "Currency And Funds Code List", 1981, are used to specify the currency subtype. A small excerpt from ISO 4217 follows: |

TABLE 9

ISO Currency Subtypes

| Alpha-code | Numeric-code | Currency | Entity |
|---|---|---|---|
| GQE | 226 | Ekwele | Equatorial Guinea |
| GRD | 300 | Drachma | Greece |
| GTQ | 320 | Quetzal | Guatemala |

| | |
|---|---|
| Month: | Speaks the specified month, e.g. "10" is spoken as "October." Specification is in MM format with "01" denoting January, "02" denoting February, etc. |
| Number: | Speaks a number in cardinal form or in ordinal form. For example, "100" is spoken as "one hundred" in cardinal form and "one hundredth" in ordinal form. |
| Silence: | Plays a specified period of silence. Specification is in 100 millisecond units. |
| String: | Speaks each character of a string, e.g. "a34bc" is spoken "A, three, four, b, c". Valid characters are a-z, A-Z, 0-9, #, and *. |
| Text: | Produces the specified text as speech or displays it on a device. |
| Time: | Speaks a time (specified as HHMM in twenty-four hour format) in either twelve hour format or twenty four hour format. For example "1700" is spoken as "Five pm" in twelve hour format or as "Seventeen hundred hours" in twenty-four hour format. |
| Tone: | Plays an algorithmically generated or pre-recorded tone. |
| Weekday: | Speaks the day of the week, e.g. "Monday." Weekdays are specified as single digits, with "1" denoting Sunday, "2" denoting Monday, etc. |

Figure 12:
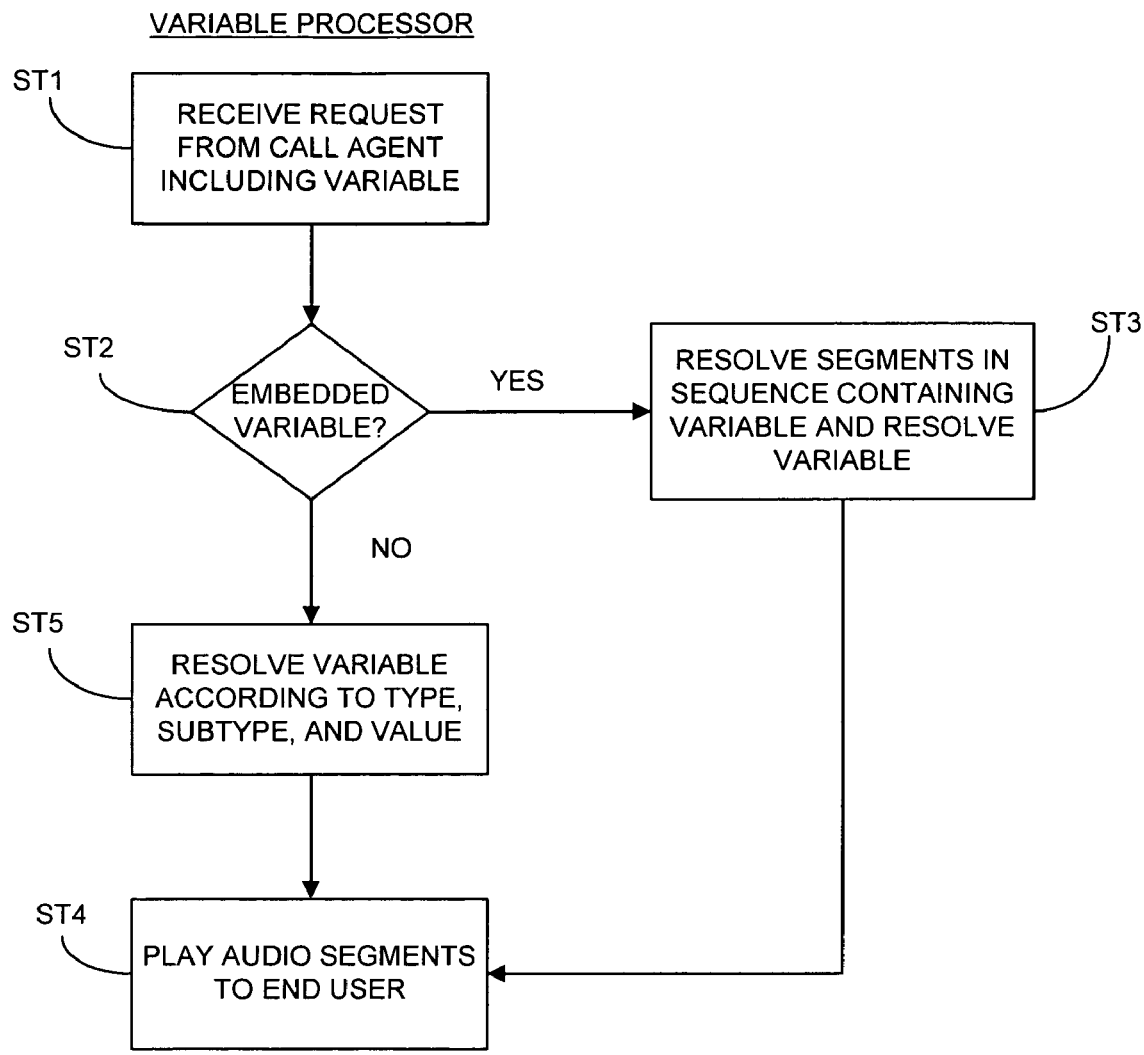
FIG. 12 is a flow chart illustrating exemplary steps that can be performed by a variable processor according to a embodiment of the present invention.

FIG. 12 illustrates exemplary steps which can be performed by a variable processor of an audio server according to an embodiment of the present invention. The steps illustrated in FIG. 12 can be performed by the variable processor after a connection has been established between the audio server and an endpoint. In step ST1, the variable processor receives a request from the call agent that includes a variable. In step ST2, the variable processor determines whether the variable is an embedded variable. If the variable is an embedded variable, in step ST3, the variable processor resolves the remaining segments of the sequence in which the variable is embedded and then resolves the variable. In step ST4, the variable processor plays the audio to the end user. In step ST2, if the variable processor determines that the variable is not an embedded variable, the variable processor resolves the variable according to type, subtype, and value, if specified (step ST5). The variable processor then plays the audio corresponding to the resolved variable to the end user (step ST4).

As discussed above, selectors allow specification of a member within a set for playback. Selectors can be applied to variables after the variable has been resolved. For instance, if a date variable resolved to "Oct. 15, 1998", the voice with which the variable is spoken could resolve to either male or female if a gender selector had been defined. In order to process a request for playing stored audio including both the variable and the selector, the audio server according to the present invention can invoke the variable processor, for example, as illustrated in FIG. 12, and then invoke the set processor, for example, as illustrated in FIG. 7. Thus, the present invention allows variables to be further qualified by set selectors. This further qualification increases the versatility at which audio can be delivered to end users.

The following example illustrates the qualification of a variable by a selector at runtime. For instance, if a variable resolves to "October Fifteenth Nineteen Ninty Nine", the variable could be further qualified (at runtime) with gender or accent or both. In order for such a runtime qualification to occur, at provisioning time, the provisioner specifies the type (e.g., time, date, money, etc.) and subtype (e.g., twenty-four hour format, French francs, etc.) of the variable. The variable can be defined to be standalone, but most often will be provisioned as a segment in a sequence of segments. The provisioner might also choose to provision the audio and data structures, i.e., sets, to support speaking the variable in a male or female voice with a Bronx or Southern accent. At runtime, the call agent invokes the sequence using the audio identifier of the sequence and supplies the data for the embedded variable, e.g., if the segment contained a money variable, the call agent might specify US dollars for the subtype, and 995 as the data, and specifying that the variable be spoken in a female voice with a Southern accent, the accent and voice being provided by a selector. The resulting announcement might be: "This item is on special today for only nine dollars and ninety-five cents" in a female voice with a Southern accent.

Multilanguage Variables

According to an important aspect, the present invention includes multi-language variables for providing audio data in a plurality of languages. As used herein, a multi-language variable is a variable, as defined above, that provides access to the same message in a plurality of languages. However, providing access to messages in multiple languages is less than straightforward because of the difference in formats and voice inflections between languages. For example, in English, an announcement for the date Aug. 9, 1999 might be "August ninth, nineteen ninety-nine" with a rising inflection at the beginning of the message and a falling inflection at the end. In French, the announcement for the same date can be "le neuf Aout dix-neuf quatre-vingt-dix-neuf." In order to invoke the French version of the message, the call agent can send the following message to the audio server:

pa(an=vbs(dat, Fr, 080999)

The audio server protocol software would locate the French audio for all of the necessary words ("le" "neuf" "Aout" "dix" "quatre" and "vingt"), i.e., using the steps illustrated in FIG. 12. Additionally, the software would know the best inflection pattern for this phrase. According to language experts, French speakers tend to use the pattern of flat inflections for all words except the last. The last word in the phrase is said with a rising inflection. For the date example, the software would choose recordings with flat inflections for all of the words except the last "neuf". A recording with "neuf" pronounced with a rising inflection would be used for this word. The algorithm for the French date would be fairly simple: first use a flat inflection recording of the article "le" or any other article, then use flat inflections for the day (i.e., "neuf"), then a flat recording for the month, then flat inflections for all of the separate words in the year except the last, and finally, use a rising inflection for the last word in the year. Thus, the present invention provides multi-language audio variables for playing messages in a plurality of languages with minimal syntax. The present invention is not limited to providing multi-language date variables. The principles described above in the date example can be extended to currency, time, greeting, or any other type of data in which it is desirable to play announcements in a plurality of languages.

Aliases

According to another aspect, the present invention includes the ability to refer to audio segments by alias. As used herein, an alias is a text string used to refer to an audio segment. The audio server package software supports alias to audio identifier mapping, which is set up through provisioning, and is referenced by the audio server at runtime to map a segment alias to the actual segment identifier. The syntax for an alias is inclusion of the alias between two forward slashes, e.g.,:

S: pa(an=/444/)
S: pa(an =/number-no-longer-in-service/)

In order to resolve aliases at runtime, the audio server can access a database that maps aliases to audio identifiers.

EXAMPLES

The following examples are protocol messages that illustrate the usefulness of the methods and systems for providing access to stored audio data according to the present invention. The examples are protocol messages including events and parameters defined in the audio server package described above. Each protocol message in the examples is preceded by a brief description of the function that the protocol message invokes in the audio server. The examples are as follows:

Play an announcement that consists of a single segment:
S: pa(an=39)
Play an announcement that consists of multiple segments:
S: pa(an=39,40,47)
Play an announcement that consists of a recording followed by silence followed by text to speech followed by a direct voice variable:
S: pa(an=39,sis(30),tss(hello),vbs(my,usd,3999))
Play an announcement with an embedded variable. If the first three segments of the previous announcement were provisioned as segment 40, the following would be exactly equivalent to the play announcement in the preceding example:
S: pa(an=40<3999>)
Play an announcement with two embedded variables:
S: pa(an=113<3999,10151998>)
Play a prompt and collect a single digit. If need be, play a reprompt, a no digits prompt, and a success or failure announcement. Give the user three attempts to enter a digit:
S: pc(ip=21,rp=109,nd=102,fa=81,sa=72,na=3)
Play a prompt and collect a single digit. If the user does not enter a digit replay the initial prompt. Give the user three attempts to enter a digit:
S: pc(ip=21,na=3)
Play a prompt and record voice. If the user does not speak, play a no speech prompt. Give the user two attempts to record:
S: pr(ip=22,ns=42,na=2)
Play an announcement ten percent faster than normal speed and five percent softer than normal volume. Play the announcement three times with two seconds of silence between plays:
S: pa(an=27,sp=+10,vl=−5,it=3,iv=20)
Give the user two attempts to enter a three digit pattern. Clear the digit buffer before playing the prompt. The user can signal end of input using the # key, which is not returned to the call agent with the collected digits.
S: pc(ip=43,cb=true,mn=3,mx=3,na=2)
Give the user three attempts to enter a three digit pattern. If the user enters one digit or two digits on the first or second attempts, a reprompt is played. If the user enters no digits on the first or second attempts a no digits reprompt is played. If all three attempts fail, a failure announcement is played. If one of the attempts is successful, a success announcement is played and the collected digits are returned to the call agent. The user can signal end of input using the # key. If the # key terminates a successful input attempt, the collected digits, but not the # key, are returned to the call agent:

S: pc(ip=87,rp=5,nd=409,fa=9,sa=18,mx=3,na=3)

Give the user a single attempt to enter a 1 to 4 digit pattern, allow 8 seconds for the user to enter the first digit, and allow 6 seconds for the user to enter each subsequent digit. If the subsequent digit timer expires after the user has less than four digits, the digits collected are returned to the call agent. The user can signal end of input using the # key which is not returned to the call agent with the collected digits:

S: pc(ip=4,fdt=80,idt=60,mx=4)

Give the user one chance to enter 2 digits where the first digit is 3,4, or 5 and the second digit is any digit except 5, 6, or 7:

S: pc(ip=8,dp=[3-5][^567])

Give the user three chances to enter an 11 digit number that begins with 0 or 1. If the user makes a mistake while entering digits, he can press the * key to discard any digits already collected, replay the prompt, and resume collection:

S: pc(ip=33,mn=11,mx=11,sik=0-1,rsk=*,na=3)

Give the user three chances to enter an 11 digit number that begins with 0 or 1. If the user makes a mistake while entering digits, he can press the key sequence *11 to discard any digits already collected, replay the prompt, and resume collection. If the user enters the key sequence *12 the play collect is terminated along with any queued events, and the terminating key sequence is returned to the call agent for processing:

S: pc(ip=33,mn=11,mx=11,sik=0-1,rsk=*11,rtk=*12, na=3)

Give the user two chances to make a recording. After playing the prompt, wait 5 seconds for the user to speak, otherwise replay the initial prompt and try again. If the user does speak, wait for seven seconds after speech stops to make sure the user is finished. If the recording is successful, return a reference to the recording to the call agent:

S: pr(ip=6,prt=50,pst=70,na=2)

Play an announcement in the default language:

S: pa(an=5)

Play the same announcement in the English. In the first example, the selector applies to the an segment; in the second it applies to the pa operation. For these particular examples, the net effect is the same:

S: pa(an=5[lang=eng]) or S: pa(an=5)[lang=eng]

Play an announcement in Danish using a female voice. Use the G.711 codec:

S: pa(an=6)[lang=dan,gender=female,codec=G711]

Play the first part of an announcement in English, the second part in the default language, and the third part in French:

S: pa(an=5[lang=eng],6,7[lang=fra])

Play an announcement with an embedded variable in English:

S: pa(an=5<101599>)[lang=eng]

Figure 1:
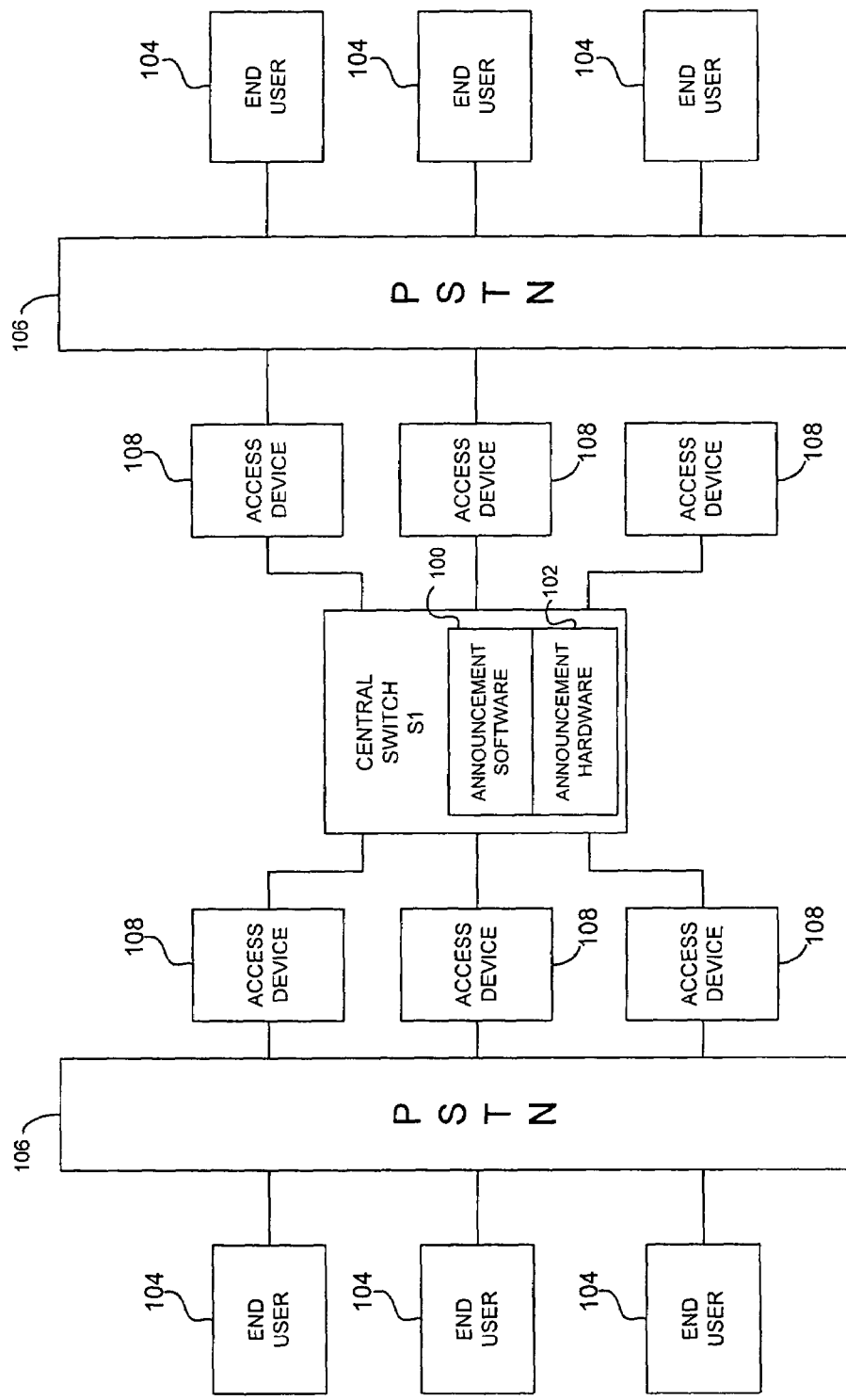
FIG. 1 is a block diagram illustrating a conventional telecommunications network.

From the examples listed above, it is apparent that the methods and systems for providing access to stored audio data according to the present invention provide increased flexibility and a convenient syntax for audio applications. The syntax is useful in both switch-centric networks, for example, as illustrated in FIG. 1, as well as packet-based networks, for example, as illustrated in FIG. 2. Several new data structures, including sequences, sets, and multilanguage variables are introduced. These data structures allow access to complex audio data through a minimum of syntax.

It will be understood that various details of the invention can be changed without departing from the scope of the invention. Furthermore, the foregoing description is for the purpose of illustration only, and not for the purpose of limitation, as the invention being defined by the following appended claims.

What is claimed is:

1. A method for providing access to a sequence of audio segments accessible by an audio server comprising:
    (a) receiving a request for playing the sequence of audio segments, wherein the sequence of audio segments comprises at least portions of network-related announcements to be played to a recipient, the sequence of audio segments being identified by an audio identifier;
    (b) locating, in an audio server database, the sequence of audio segments based on the audio identifier; and
    (c) playing the sequence of audio segments to the recipient so that the recipient is apprised of at least one network-related announcement.

2. The method of claim 1 wherein receiving a request includes receiving a request from a media gateway control protocol (MGCP) call agent.

3. The method of claim 2 wherein receiving a request includes receiving an MGCP NotifyRequest command from the call agent.

4. The method of claim 1 wherein playing the sequence of audio segments includes transmitting audio data packets to a gateway over a packet-based network, and wherein the gateway plays the sequence of audio segments.

5. The method of claim 1 wherein receiving a request for playing the sequence of audio segments includes receiving a request for playing the sequence of audio segments wherein at least one of the audio segments is a variable.

6. The method of claim 5 wherein playing the sequence of audio segments includes resolving the variable into an audio segment.

7. A method for providing access to elements of a set of stored audio data comprising:
    (a) receiving a request generated by a network component, said request comprising a request to play an audio segment to a recipient, the audio segment relating to a network-related announcement, the request including an audio identifier for identifying a set containing the audio segment and a selector for specifying a member of the set corresponding to the audio segment; and
    (b) selecting the audio segment to be played based on the audio identifier and the selector.

8. The method of claim 7 wherein the set contains a plurality of levels of audio data qualifiers and the selector specifies a path through the levels that leads to the member corresponding to the audio segment to be played.

9. The method of claim 7 wherein the set contains a plurality of levels of audio data qualifiers and the selector specifies a partial path through the levels and selecting the audio segment to be played includes traversing the levels in an order specified by the selector and supplying default paths through levels not specified by the selector.

10. The method of claim 7 wherein receiving a request to play an audio segment includes receiving a request from a media gateway control protocol (MGCP) call agent.

11. The method of claim 10 wherein receiving a request to play an audio segment includes receiving an MGCP NotifyRequest command from the MGCP call agent.

12. A method for providing access to stored audio data segments corresponding to variables comprising:
(a) receiving a request to play a sequence of audio data segments, the sequence of audio data segments adapted to convey a network-related announcement to a recipient, the request including a variable; and
(b) determining whether the variable is an embedded variable;
(c) in response to determining that the variable is an embedded variable, resolving a sequence of audio data segments containing the variable and resolving the variable; and
(d) playing the sequence of audio data segments including the variable.

13. The method of claim 12 comprising, in response to determining that the variable is not an embedded variable, resolving the variable into at least one audio data segment based on at least one of type, subtype, and value of the variable.

14. The method of claim 13 wherein the variable is a multilanguage variable and wherein resolving the variable includes selecting audio data segments to be played based on a language specified by the variable.

15. The method of claim 12 wherein the variable is a multilanguage variable and wherein resolving the variable includes selecting audio data segments to be played based on a language specified by the variable.

16. The method of claim 12 wherein receiving a request to play the sequence of audio data segments includes receiving a request including a variable and a selector and resolving the variable includes identifying a set containing an audio data segment to be played.

17. The method of claim 16 further comprising identifying the audio data segment to be played based on the selector.

18. The method of claim 13 wherein receiving a request to play the sequence of audio data segments includes receiving a request including a variable and a selector, wherein resolving the variable includes identifying a set containing an audio data segment to be played.

19. The method of claim 18 comprising identifying the audio data segment to be played based on the selector.

20. A sequence processor for providing access to a sequence of audio segments accessible by an audio server, the sequence processor comprising:
(a) means for receiving a request for playing the sequence of audio segments, wherein the audio segments comprise at least portions of network-related announcements to be played to a recipient, the sequence of audio segments being identified by an audio identifier;
(b) means for locating, in an audio server database, a provisioned sequence of audio segments based on the audio identifier; and
(c) means for playing the sequence of audio segments to the recipient so that the recipient is apprised of at least one network-related announcement.

21. The sequence processor of claim 20 wherein the means for receiving a request comprises means for receiving a request from a media gateway control protocol (MGCP) call agent.

22. The sequence processor of claim 20 wherein the means for playing the sequence of audio segments includes means for transmitting the audio segments to a gateway over a packet-based network, and wherein the gateway plays the sequence of audio segments.

23. The sequence processor of claim 20 wherein the means for receiving a request includes means for receiving a sequence including at least one variable and wherein the means for playing the sequence of audio segments includes means for resolving the variable into an audio data segment.

24. A set processor for providing access to elements of a set of stored audio data, the set processor comprising:
(a) means for receiving a request generated by a network component, requesting to play an audio segment to a recipient, the audio segment comprising at least a portion of a network-related announcement to be played to a recipient, the request including an audio identifier for identifying a set containing the audio segment and a selector for specifying a member of the set corresponding to the audio segment; and
(b) means for selecting the audio segment to be played based on the audio identifier and the selector.

25. The set processor of claim 24 wherein the set contains a plurality of levels of audio data qualifiers and the selector specifies a path through the levels that leads to the member corresponding to the audio segment to be played, wherein the means for selecting the audio segment to be played to the recipient includes means for traversing the set based on the path specified by the selector.

26. The set processor of claim 24 wherein the set contains a plurality of levels of audio data qualifiers and the selector specifies a partial path through the levels and the means for selecting the audio data segment to be played includes means for traversing the levels in the order specified by the selector and supplying default paths through the levels not specified by the selector.

27. A variable processor for providing access to stored audio data segments corresponding to variables, the variable processor comprising:
(a) means for receiving a request to play a sequence of audio segments, the sequence of audio segments adapted to convey a network-related announcement to a recipient, the request including a multilanguage variable specifying a language in which the audio sequence is to be played;
(b) means for resolving the multilanguage variable into at least one audio segment based on the language specified in the request; and
(c) means for playing the audio segment.

28. The variable processor of claim 27 wherein the means for resolving the multilanguage variable includes means for selecting audio segments having inflections in accordance with the language specified in the request.

29. The variable processor of claim 27 comprising means for qualifying the multilanguage variable after resolving the multilanguage variable using a selector.

30. A method for accessing stored audio data comprising:
(a) transmitting a request to an audio server for playing stored audio data, the request including an audio identifier identifying a sequence of audio segments to be played and a selector for specifying a member of the sequence of audio segments;
(b) locating, in an audio server database, a sequence of provisioned audio segments corresponding to the audio identifier; and
(c) playing the sequence of audio segments to a recipient to convey a network-related announcement.

31. The method of claim 30 wherein transmitting a request to an audio server includes transmitting a request from a media gateway control protocol (MGCP) call agent to an audio server.

32. The method of claim 30 wherein playing the sequence of audio segments to the user includes sending the sequence of audio segments to the recipient over a packet-based network.

33. A method for accessing stored audio data comprising:
(a) transmitting a request to an audio server to play an audio segment, the audio segment including at least a portion of a network-related announcement to be played to a recipient, the request including an audio identifier for identifying a set containing the audio segment and a selector for specifying a member of the set corresponding to the audio segment; and
(b) selecting the audio segment to be played based on the audio identifier and the selector.

34. The method of claim 33 wherein transmitting a request to an audio server comprises transmitting a request from a media gateway control protocol (MGCP) call agent to the audio server.

35. The method of claim 33 wherein the set contains a plurality of levels of audio data qualifiers and the selector specifies a path through the levels that leads to the member corresponding to the audio segment to be played.

36. The method of claim 33 wherein the set contains a plurality of levels of audio data qualifiers and the selector specifies a partial path through the levels and selecting the audio data segment to be played includes traversing the levels in the order specified by the selector and supplying default paths through levels not specified by the selector.

37. A computer storage medium comprising software for instructing a computer to:
(a) provide a first data field containing an audio identifier representing a set containing a plurality of members representing audio segments comprising at least portions of network-related announcements to be played to a recipient; and
(b) provide a second data field containing a selector for selecting one of the members in the set.

38. An audio server comprising:
(a) an interface card for receiving a request for playing a sequence of stored audio data segments, the audio data segments comprising at least portions of network-related announcements to be played to a recipient, the sequence of stored audio data segments being identified by an audio identifier;
(b) an audio server database embodied in a memory device storing provisioned sequences of audio data segments; and
(c) a processor programmed to extract a sequence of audio segments from the audio server database using the audio identifier in the request.

39. The audio server of claim 38, comprising at least one digital signal processing (DSP) card for converting the sequence of audio data segments extracted from the audio server database into a format for playing to the recipient.

40. The audio server of claim 38, wherein the audio server database includes sets having members representing audio data segments, and each of the members being selectable by a selector, and wherein the processor is programmed to locate a set in the audio server database based on an audio identifier received in a request and to locate a member in the set based on the selector received in a request.

41. A method for providing access to audio data segments accessible by an audio server comprising:
(a) receiving a request for playing audio data segments, the audio data segments comprising at least a portion of a network-related announcement to be played to a recipient, the request including a first parameter for identifying the audio data segments and a second parameter for selecting one of the audio segments;
(b) locating, in an audio server database, the audio data segments based on the first parameter; and
(c) playing the audio segments.

42. The method of claim 41, wherein the first parameter is an audio identifier for identifying a sequence of audio data segments, and wherein locating the audio data segments includes locating the sequence of audio data segments based on the audio identifier.

43. The method of claim 41, wherein receiving a request for playing audio data segments includes receiving a request including an audio identifier for identifying a set of audio data segments and a selector for selecting members of the set, and wherein locating the audio segments in the audio server database includes locating the segments based on the audio identifier and the selector, wherein the second parameter is the selector.

44. The method of claim 41, wherein the first parameter is a variable, and wherein locating the audio data segments in the audio server database includes resolving the variable into an audio data segment.

45. A computer storage medium comprising software for instructing a computer to:
(a) provide an event symbol recognizable by an audio server for instructing the audio server to detect or perform an action, the event symbol including a play announcement parameter for instructing the audio server to play a network-related announcement;
(b) provide a first parameter associated with the event symbol for defining how the audio server detects or performs the action, the first parameter including an announcement parameter for indicating the network-related announcement to be played; and
(c) provide an audio identifier associated with the announcement parameter for uniquely identifying an audio segment including the network-related announcement to be played.

46. The computer storage medium of claim 45 comprising a variable parameter associated with the play announcement parameter for instructing the audio server to resolve a variable into an audio identifier and play the announcement specified by the audio identifier.

47. The computer storage medium of claim 45 comprising a set parameter and a selector parameter associated with the play announcement parameter for instructing the audio server to access a set of stored audio segments and locate the audio segment containing the announcement to be played based on the selector.

* * * * *